United States Patent [19]
Papa

[11] 4,033,910
[45] July 5, 1977

[54] METHYL FORMATE AS AN ADJUVANT IN PHENOLIC FOAM FORMATION
[75] Inventor: Anthony Joseph Papa, Saint Albans, W. Va.
[73] Assignee: Union Carbide Corporation, New York, N.Y.
[22] Filed: Sept. 26, 1975
[21] Appl. No.: 617,243
[52] U.S. Cl. .................. 260/2.5 F; 260/2.5 FP; 260/29.3; 260/53 R; 260/54; 260/55; 260/57 C
[51] Int. Cl.² .................................. C08J 9/14
[58] Field of Search .................. 260/2.5 F, 2.5 B

[56] References Cited
UNITED STATES PATENTS

| | | | |
|---|---|---|---|
| 2,493,075 | 1/1950 | La Lande, Jr. et al. | 260/2.5 F |
| 2,910,446 | 10/1959 | Roth | 260/2.5 B |
| 2,911,381 | 11/1959 | Roth | 260/2.5 B |
| 2,911,382 | 11/1959 | Barkhuff, Jr. et al. | 260/2.5 B |
| 3,389,094 | 6/1968 | D'Alessandro | 260/2.5 F |
| 3,879,315 | 4/1975 | Watkinson | 260/2.5 A |
| 3,914,191 | 10/1975 | Scott | 260/2.5 B |

Primary Examiner—Morton Foelak
Attorney, Agent, or Firm—Marylin Klosty

[57] ABSTRACT

This invention relates to the use of methyl formate as an adjuvant in the formation of phenolic foam. The addition of methyl formate to phenol-aldehyde resoles causes a substantial reduction in resole viscosity and thus allows for the processing of resoles which are otherwise too viscous to be foamed. A further advantage of methyl formate as an adjuvant in the formation of phenolic foam is that it also functions as a blowing agent. In its use as a blowing agent, methyl formate is employed in combination with 1,1,2-trichloro-1,2,2-trifluoroethane. Depending upon the nature of the phenolic foaming resin, the use of methyl formate in combination with 1,1,2-trichloro-1,2,2-trifluoroethane as the source of blowing action further provides the advantageous result of allowing for the formation of phenolic foam of reduced friability.

14 Claims, 1 Drawing Figure

METHYL FORMATE AS AN ADJUVANT IN PHENOLIC FOAM FORMATION

FIELD OF THE INVENTION

The present invention relates generally to the foaming of base-catalyzed condensation products derived from a phenol and an aldehyde such as, in particular, phenolformaldehyde resoles. In one aspect, the invention is concerned with providing improvements in the processing of such raw materials to phenolic foam products. In another aspect, the invention is concerned with providing a particular adjuvant for phenolic foam formation which is both a processing aid and source of blowing action.

BACKGROUND OF THE INVENTION

It is well known to the art that condensation of a phenol and an aldehyde provides materials curable to thermoset phenolic resins. Base-catalyzed condensation employing at least about a stoichiometric amount of aldehyde provides condensates known as resoles whereas acid catalysts and a deficiency of aldehyde provides novolacs. Characteristic of both liquid and solid resoles is their heat-curability to fully cross-linked, infusible products without the need for an added cross-linking agent. From this standpoint, resoles are more descriptively referred to as One-Step phenolic resins in contrast to novolacs or Two-Step resins which do require the addition of a cross-linking agent for the curing process. The reactivity of resoles and ability to self-condense to higher molecular weight resins is attributable to the presence of hydroxymethyl groups which become bonded to the aromatic phenolic nucleus during the base-catalyzed condensation.

Curing of resoles to higher molecular weight, cross-linked thermoset resins proceeds with generation of heat and is accelerated by acid materials. In the presence of strongly acidic accelerators of the exothermic reaction and a source of blowing action, liquid resoles cure rapidly to cellular phenolic resins. Although phenolic foams are used to embed floral arrangements and for general packaging purposes, they have not found the widespread industrial application enjoyed by cellular polyurethanes. As compared with cellular polyurethanes, phenolic foams possess better inherent resistance to burn with an open flame, and emit very low levels of smoke on heating. Consequently, greater attention is being focused on phenolic foam technology, so as to develop practical products having more widespread end-use applications. From the standpoint of commercial application, the most significant resoles are those derived from phenol itself and formaldehyde. In addition to improving certain properties of phenolic foams such as their friability and punking behavior (that is, glowing combustion without a visible flame), there is also a need to provide improvement in the processability of the resole raw materials.

The major component of phenolic foam formulations is the resole itself. Consequently, foaming of the formulation is hampered in those instances where the resole is highly viscous. Viscosity increase to relatively high levels is often observed during storage of the resole raw material. The build-up in viscosity associated with conventional resole resins of poor shelf-life is brought about by the tendency of such materials to advance to an irreversibly higher molecular weight form upon aging. Such self-polymerization is evidenced by a consequential loss in the reactivity of the resole as a foamable composition which in turn is reflected by a corresponding substantial increase in the density of phenolic foam derived therefrom. In those instances where the aged resole may have retained some measure of reactivity as a foamable composition, it may not be properly processable because its viscosity is too high.

The prior art recognizes the problems associated with the poor shelf life of conventional resoles and that aging or self-condensation during storage is associated with substantial increase in resole viscosity. For example, in accordance with U.S. Pat. No. 3,313,766, the stability of phenolic resoles intended for use as binders is said to be improved and viscosity reduced by the addition to the resole of trioxane.

Build-up of viscosity during aging is also associated with the particular ion exchanged resoles described in my prior and copending application Ser. No. 595,744, filed July 14, 1975. Among other distinguishing features and improved properties, the resoles described in said application are noteworthy for their inherently greater stability and excellent shelf-life, as well as for their enhanced reactivity as foamable compositions. The substantial increase in viscosity which is often observed during aging of these improved resoles is not accompanied by a corresponding loss in their reactivity as foamable compositions. This characteristic indicates that viscosity build-up of such improved foamable compositions is brought about by a physical phenomenon such as, for example, intermolecular bonding, as opposed to self-condensation by chemical reaction to higher molecular weight and less reactive foams. Intermolecular bonding is also indicated for such resoles as freshly prepared for, despite relatively high initial viscosities which are sometimes observed, they are highly reactive as foamable compositions.

Irrespective of the cause of the increase in viscosity, lack of sufficient resole fluidity may either preclude processing to a foam or may hamper proper mixing of the components of the foam formulation. If adequate homogeneity of the resole with other ingredients such as the acidic catalyst, blowing agent and, when used, a surface active agent, is not realized, uneven foam rise occurs and the foam is of poorer overall quality than might otherwise be obtainable.

Among the blowing agents reported in the literature for phenolic foam formation are the polyhalogenated saturated fluorocarbons having a boiling point within the range from about minus 40° F. up to about 200° F. described in U.S. Pat. No. 3,389,094. Illustrative of this class are trichloromonofluoromethane, 1,1,2-trichloro-1,2,2-trifluoroethane ($CCl_2FCClF_2$), dichlorodifluoromethane, 1,2-difluoroethane and 1,1,1,2-tetrachloro-2,2-difluoroethane. Other halogenated blowing agents are chlorohydrocarbons such as methylene chloride and 1,2-dichloroethane. Another class of suitable foaming agents are the aliphatic ethers having a boiling point between 30° C. and 100° C. such as diethyl ether, diisopropyl ether and other such compounds described in U.S. Pat. No. 2,845,396. Of these conventional blowing agents, the chlorofluorocarbons such as in particular, trichloromonofluoromethane and 1,1,2-trichloro-1,2,2-trifluoroethane, having a tendency to give premixes with phenolic resoles which have viscosities greater than the resole itself. This may further complicate processability when the resole itself is relatively high in viscosity. Further, blowing agents commonly used in forming phenolic foams are usually insoluble in the resole raw material. It is believed that these incompatible premixes are, at least in part, controlling factors for formation of rigid phenolic foams which have a very fine cell structure relative to polyurethane foam. Such incompatibility is a disadvantage when it is desired to provide phenolic foam which is of larger cell size relative to fine cell phenolic foam but which is still of finer cell size relative to polyurethane foam.

It is an object of this invention, therefore, to provide an adjuvant for phenolic foam formation which allows for improvement in the processability of phenolic resoles, particularly resoles which lack sufficient fluidity for proper foaming.

Another object is to provide a processing aid for phenolic foam formation which has the aforesaid advantage and is additionally capable of functioning as a source of blowing action for the foaming operation.

Another object is to provide a blowing agent for phenolic foam which is compatible with phenol-formaldehyde resoles and which, despite its compatibility, allows for the formation of phenolic foam which has a finer cell structure than polyurethane foam.

A further object is to provide an improved method for the formation of cellular phenolic products.

Various other objects and advantages of this invention will become apparent to those skilled in the art from the accompanying description and disclosure.

SUMMARY OF THE INVENTION

The present invention is predicated, in part, on the discovery that methyl formate is an especially effective adjuvant in the formation of phenolic foam and offers a number of advantages in this respect. For example, it has been found that methyl formate is capable of reducing the viscosity of phenolic resoles including resoles which are otherwise too viscous to be foamed properly. In addition to adding methyl formate to resoles which lack sufficient fluidity for processability, methyl formate is also used with advantage as a suppressant of viscosity build-up caused, for example, by physical phenomena such as intermolecular bonding. In accordance with this aspect of the invention, blends are provided containing a phenol-aldehyde resole and methyl formate in an amount from about 0.4 to about 20 parts by weight per 100 parts by weight of resole.

In addition to its function as a viscosity lowering additive, methyl formate is also capable of functioning as a blowing agent for phenolic foam formulations. It is generally found, however, that when used as the sole source of blowing action, methyl formate provides an unsatisfactory product in that the product is either very hard, splits badly, exhibits excessive void formation and/or its friability is enhanced severely, that is, friability is increased by as much as 100 percent or more. On the other hand, it has been discovered that methyl formate in combination with 1,1,2-trichloro-1,2,2-trifluoroethane is an especially useful blowing agent for phenolic foam formation. In accordance with another aspect to the present invention, blends are provided containing particular proportions of: (A) a phenol-aldehyde resole; (B) methyl formate; and (C) 1,1,2-trichloro-1,2,2-trifluoroethane. In such blends, the total combined weight of (B) and (C) ranges from about 2 to about 40 parts by weight per 100 parts by weight of (A) and, of the total weight of (B) and (C), from about 5 to about 80 weight percent is methyl formate and from about 95 to about 20 weight percent is 1,1,2-trichloro-1,2,2-trifluoroethane, provided the blend contains at least 0.4 and no more than about 20 parts by weight of methyl formate per 100 parts by weight of resole component (A).

The present invention also provides a method for producing phenolic foam which method comprises polymerizing a phenol-aldehyde resole in the presence of an acid accelerator for the polymerization of the resole, and a blowing agent containing methyl formate and 1,1,2-trichloro-1,2,2,-trifluoroethane. The combined weight of methyl formate and 1,1,2-trichloro-1,2,2-trifluoroethane contained in the polymerization reaction mixture is between about 2 and about 40 parts by weight per 100 parts by weight of resole and, of this combined weight, from about 5 to about 80 weight percent is constituted of methyl formate provided the polymerization reaction mixture contains at least 0.4 and no more than about 20 parts by weight of methyl formate per 100 parts by weight of resole. When the process of this invention is applied to conventional phenol-aldehyde foamable resoles, that is, resoles produced by treatment of alkaline-catalyzed phenol-aldehyde condensates with acidic neutralizing agents such as sulfuric acid thereby forming salts, it is found that, as the methyl formate concentration is increased in any given formulation, the foamed product becomes more friable relative to foam blown with the 1,1,2-trichloro-1,2,2-trifluoroethane alone. Thus, in applying the process of the present invention to such conventional phenolic resoles, the amount of methyl formate in the blowing agent is maintained at a level of no more than 50 weight percent based on the total weight of blowing agent.

In contrast to the observation concerning the effect on friability of foam produced from conventional foamable resoles, it has been found that application of the process of the present invention to the aforementioned stable, ion exchanged resoles described in patent application Ser. No. 595,744, filed July 14, 1975, quite unexpectedly provides phenolic foam having a friability resistance which is about the same as that of foam blown with 1,1,2-trichloro-1,2,2-trifluoroethane only or is actually substantially improved. The substantial retainment of or improvement in the friability resistance of foam derived from such ion exchanged resoles is realized when the blowing agent of the present invention contains from about 20 to about 70 weight percent of methyl formate.

It is also found that the use of methyl formate as a source of blowing action of foam formulations containing the aforementioned ion exchanged resoles provides phenolic foam product of larger cell size than phenolic foam blown solely with 1,1,2-trichloro-1,2,2-trifluoroethane. On the other hand, a reverse effect on cell size is observed when the resole is of the conventional type.

DETAILED DESCRIPTION OF THE INVENTION AND PREFERRED EMBODIMENTS

The use of methyl formate as a processing aid and source of blowing action in the formation of phenolic foam as described herein is applicable to any liquid resole derived from base-catalyzed condensate of a phenolic compound and an aldehyde. In addition to phenol itself, other compounds having a phenolic hydroxyl group (i.e., -OH bonded directly to a benzene nucleus) and from two to three unsubstituted ring carbon atoms in the ortho and para position to the phenolic hydroxyl group are suitable. Such compounds include mononuclear phenolic compounds are well as polynuclear phenolic compounds, that is, compounds having more than one benzene nucleus to which a phenolic hydroxyl group is bonded. For example, suitable mononuclear phenols are those compounds encompassed by the general formula, where $R_1$ through $R_5$ are hydrogen, hydroxyl or alkyl including any combination thereof, provided at least two of $R_1$, $R_3$ and $R_5$ are hydrogen. When present, the alkyl groups may have from one up to twenty carbon atoms. Illustrative of suitable compounds encompassed by the above formula are any of the following: phenol; resorcinol; catechol; ortho-, meta-, and para-cresols; 2,5-, 3,4- and 3,5-xylenols; 3-ethylphenol; 3,5-diethylphenol; and conventional parasubstituted alkylphenols such as p-tert-butylphenol, p-amylphenol, p-nonylphenol, p-dodecylphenol, p-tetradecylphenol, p-octadecylphenol; and the like.

Illustrative of suitable dinuclear phenolic compounds are: 2,2-bis(4-hydroxyphenyl)propane, 2,2-bis(4-hydroxyphenyl)butane, and 2,2bis(4-hydroxy-3-methylphenyl)propane, which are also known to the art as Bisphenol A, B and C, respectively. Illustrative of other suitable polynuclear phenolic reactants are the following tri- and tetranuclear compounds which are the respective reaction products of phenol and acrolein (3:1 mole ratio) and of phenol and glyoxal (4:1 mole ratio):

wherein the alkylidene bridging groups are linked to the respective benzene nuclei at the carbon atoms para to phenolic hydroxyl.

It is to be understood that any of the above phenolic reactants including phenol itself, may be used individually or in combination. Usually, however, the para-substituted alkylphenols and/or polynuclear phenolic compounds are used in combination with phenol. Also suitable for use in combination with phenol are one or more beta-phenylethyl substituted phenols such as, for example, 2-(beta-phenylethyl)phenol, 4-(beta-phenylethyl)phenol, 2,4-(beta-phenylethyl)phenol and other such isomeric compounds. When phenol is used in combination with other phenolic compounds such as, for example, the aforementioned alkylphenols, beta-phenylethylphenols and polynuclear phenols, the additional phenolic compound is usually used in an amount of no more than about 50 parts by weight per 100 parts by weight of phenol.

In addition to formaldehyde, other aldehydes which are useful in forming condensates from which phenolic resoles useful in the practice of the invention may be derived are: glyoxal, acetaldehyde, chloral, furfural and benzaldehyde. Further, formaldehyde may be used as free formaldehyde, usually added in aqueous solution, or in the form of its low molecular weight polymers such as paraformaldehyde or in the form of other substances capable of providing free formaldehyde under the condensation reaction conditions described herein. It is to be understood that any of the aforesaid aldehydes including formaldehyde may be used individually or in combination.

The phenolic compound and aldehyde such as, in particular, phenol and formaldehyde, are condensed at a molar ratio of aldehyde:phenolic compound of from about 1:1 to about 3:1. In the formation of phenol-formaldehyde condensates, the formaldehyde is added to the reaction system as an aqueous solution containing from about 3.5 to about 45 weight percent HCHO. The relative proportions of phenol and formaldehyde are also often expressed in terms of formaldehyde factor which defines the parts by weight of aqueous formaldehyde solution charged to the reaction zone per 100 parts by weight of total phenolic compound. The value of the formaldehyde factor varies depending upon the content of formaldehyde in the particular aqueous solution employed. As expressed on the basis of 37 weight percent aqueous formaldehyde, the factor is usually between about 100 and about 190, and is more usually between about 110 and about 180.

The condensation of the phenolic compound and aldehyde is effected in the presence of an alkaline metal catalyst such as hydroxides, oxides, carbonates and bicarbonates of any of the alkali metal and alkaline earth metals. Illustrative of suitable catalysts are the respective hydroxides of lithium, sodium, potassium, rubidium, cesium, francium, barium, calcium and magnesium, as well as potassium and sodium carbonates, bicarbonates, calcium oxide, and the like. The concentration of alkaline metal catalyst may vary over a relatively wide range such as between about 0.1 and about 10, and is usually no more than about 5, parts by weight per 100 parts by weight of total phenolic compound fed to the reaction zone.

The condensation reaction is generally effected at temperatures between about 60° and about 110° C. and more usually between about 65° C. and about 100° C. The reaction may be effected at atmospheric pressure although usually reduced pressure such as between about 150 and about 650 mm. mercury is used. The pressure is adjusted consistent with the desired reaction temperature. Condensation time may vary between about 0.5 and about 15 hours, and is usually no more than about 10 hours.

The alkaline condensate is aqueous, the water content thereof generally ranging between about 10 and about 60 weight percent, and is usually no more than about 40 to 50 weight percent. Water is introduced to the system with the catalyst which is preferably added as a preformed aqueous solution and, when formaldehyde is used as the aldehyde reactant, water is also introduced as the carrier medium for the formaldehyde. Varying amounts of water are also formed as by-product of the condensation reaction. In regard to resoles to be employed in the formation of phenolic foam it is desirable that the final resole product have a water content of no more than about 10 weight percent. Concentration of liquid condensate to a particular predetermined water content is readily accomplished by conventional stripping at reduced pressure such as, for example, at a reduced pressure from about one to about 200 mm. mercury, and at temperatures from about 30° to about 75° C., or by any other technique known to the art of resole formation.

The alkalinity of the condensation products is due to the presence of the alkaline condensation catalyst and is dealt with in a variety of ways. One method, which is conventional, is to neutralize the basic condensate by the addition thereto of an acidic compound such that the pH of the resole product is between about 5.2 and about 7. Illustrative of acidic compounds reported in the literature as suitable for this purpose include phosphoric acid, hydrochloric acid and sulfuric acid. Depending upon any one or more of a number of factors such as the particular alkaline catalyst employed, the acidic compound added for neutralization thereof and the water content of the resole, the salt of neutralization may remain solubilized in the resole product or some portion thereof may precipitate. In the latter event, filtration or other liquid-solids separation technique, is required to separate the precipitated salts. In the commercial manufacture of any grades of phenol-formaldehyde resoles supplied as foamable resins, filtration is avoided by the employment of barium hydroxide which, when neutralized with sulfuric acid, forms a salt which does not precipitate and is left in the product.

It is to be understood that, as used herein, expressions such as "conventional resoles," "resoles of the conventional type" and the like, have reference to resoles produced by methods in which alkaline phenol-aldehyde condensates are treated by the addition thereto of neutralizing compounds thereby forming salts. Such resole compositions are generally associated with poor shelf-life and are, as recommended by the manufacturer, maintained under refrigeration (about 5° to 7° C.) during shipment and storage prior to use.

Although the use of methyl formate as a processing aid and source of blowing action as described herein is applicable to the formation of phenolic foam from the above-described conventional resoles as well as any other type of resole described in the literature, the teachings of the present invention are applied with particular advantage to the novel phenol-aldehyde resoles described in my aforementioned prior and copending application Ser. No. 595,744, filed July 14, 1975. The resoles described in said application are referred to herein as the "ion exchanged resoles" which term denotes that they are free of ionic species capable of being removed by the free acid form of a cation exchange resin and by the free base form of an anion exchange resin. They are prepared by the method which comprises treatment of liquid condensate formed by the alkaline metal catalyzed reaction of a phenolic compound and an aldehyde under the above-described condensation conditions, with the free acid form of a cation exchange resin and the free base form of an anion exchange resin. In marked contrast to the poor shelf-life of the above-described conventional resoles, the ion exchanged resoles described in said copending application retain their reactivity as foamable compositions for far greater periods of time at ordinary ambient temperatures (about 20° C.–26° C.) such as at least 3 to 6 months and longer, thereby obviating the need for cooling or refrigeration prior to use. The excellent shelf-life and aging characteristics of the ion exchanged resole compositions employed in the practice of the present invention is attributable to their freedom from ionic species that respond to removal by the aforementioned ion exchange resins which are of two types. The first type is a cation exchange resin in its free acid form, that is, having exchangeable hydrogen cations ($H^+$) attached thereto. Such resins exhibit exchange potential with alkaline metal cations introduced to the phenol-aldehyde condensate as catalyst such as $Na^+$, $K^+$ and $Ba^{++}$. The hydrogen cations of the exchange resin are present as strongly acidic groups such as sulfonic acid groups ($-SO_3H$) or as weakly acidic groups ($-COOH$). Preferably, the cation exchange resin is of the strongly acidic variety. The particular polymeric structure to which the cation exchanging groups are attached is not critical to achieve the desired cation exchange reaction. Examples of suitable strong cation exchange resins are: styrene-divinylbenzene sulfonated resins, phenol-formaldehyde sulfonic acid resins, benzeneformaldehyde sulfonic acid resins, and the like. Such resins have been sold and marketed by several companies under various trade names. For instance, Rohm and Haas Company's series of sulfonated copolymers of styrene and divinylbenzene, available as Amberlite 200, 200C, IR-120, IR-122, IR-124 and XE-100, respectively, are suitable. Other suitable strong acid cation exchange resins are marketed by Dow Chemical Company as Dowex 50-W, and by Diamond Shamrock Company as Duolite C-3 and C-25. Illustrative of the weakly acidic cation exchange resins are crosslinked-acrylic polymers and copolymers of methacrylic acid and divinylbenzene available as Amberlite IRC-84 and IRC-50, respectively, of Rohm and Haas Company.

Some of the above-described cation exchange resins are marketed in the salt form. Therefore, prior to use in the preparation of the ion exchanged resoles employed in the practice of the present invention, such resins are treated to convert the ion exchange groups into the free acid form. This is readily effected with a mineral acid such as sulfuric acid or hydrochloric acid and the like. An excess of acid is generally used. Afterward, the excess acid is washed out with water or suitable solvent to remove the released salts. Spent resin is regenerated similarly.

The ion exchanged resoles employed in the practice of the present invention are also free of anions capable of being removed by an anion exchange resin in its free base form, that is, in a form having hydroxyl of free amino groups thereon. The anion exchange resin may be in either a strongly basic or weakly basic form. Those of the strongly basic variety are usually copolymers of styrene and divinylbenzene having quaternary ammonium substituents such as $[-N(CH_3)_3]^+Cl^-$ and $-[N(CH_3)_2(CH_2OH)]^+Cl^-$. Illustrative of suitable resins of this type are marketed by Rohm and Haas Company as Amberlite IRA-900, IRA-904, IRA-910, IRA-911 and IRA-400, respectively. Prior to use, such strongly basic anionic resins are treated with alkali such as aqueous alkali metal hydroxide solutions to replace the chloride anions with free hydroxyl and thereby form the trimethyl-ammonium hydroxide radical, $-N(CH_3)_3^+OH^-$. The resin is then washed thoroughly with water to remove the chloride salts. Also suitable are the weakly basic anion exchangers having polyamine functionality bonded to a matrix of styrene-divinylbenzene copolymer or crosslinked acrylic polymer. Such resins are available in their free base form Rohm and Haas Company as Amberlite IRA-45, IRA-93 and IRA-68, respectively. When these various anion exchangers become spent they are readily regenerated by treatment with strong alkali (e.g., 2-5 weight percent aqueous potassium hydroxide) to replenish the hydroxyl groups or, in the case of the weakly basic variety, to free the amine functionality of salts.

In the preparation of the ion exchanged resoles, the ion exchange operation may be carried out batchwise or continuously. In either mode of operation, the alkaline phenol-aldehyde condensate may be deionized by treatment thereof with the two different types of ion exchange resins arranged as a mixed bed or as individual beds. In mixed bed operation, the alkaline condensate is intimately contacted with the exchange resin until the pH of the treated liquid substantially stabilizes at a value within the range of between about 4 and about 7, thereby indicating essentially complete deionization.

In carrying out the ion exchange reactions employing individual beds of resin, the alkaline condensate is intimately contacted with the cation exchange resin in its free acid form for a residence time sufficient to lower the pH of the condensate undergoing treatment to a value within the range from about 1.5 to about 4. Preferably the treatment is effected until the pH substantially stabilizes at a particular value within this range. Usually the pH stabilizes at a value between about 2 and about 3.5. Stabilization of the pH indicates essentially complete removal of cations. The cation exchanged liquid is then intimately contacted with the free base form of the anion exchange resin for a residence time sufficient to raise the pH to a value within the range of from about 4 to about 7. Preferably the anion exchange treatment is effected until the pH remains substantially stable at a particular value within this range. Usually the pH stabilizes at a value between about 4.5 and about 6.5. Stabilization of pH indicates essentially complete removal of anions.

By "substantial stabilization" of pH at a particular value within the aforesaid respective ranges is meant a condition at which fluctuation in pH is no greater than about ± 0.3.

In batch operation employing a mixture of the cation and anion exchange resins or sequential treatment of the alkaline condensate with these respective ion exchangers, intimate contact is readily effected by agitation of a slurry of the resins in the liquid condensate by any suitable means. When the pH is brought to within the aforesaid ranges, the liquid condensate and exchange resins are separated by conventional liquidsolids techniques such as decantation or filtration. In carrying out deionization sequentially, the liquid condensate is treated initially with the cation exchange resin and, inasmuch as the cation-exchanged material is acidic and has not yet been de-anionized, such as separation and passage of liquid to the anion exchange treatment step would be effected as quickly as possible to minimize residence time in the acid solution and thereby avoid polymerization.

In continuous operation, the ion exchange resins are conveniently contained in the same or different columns. The flow of condensate through the column or columns is operable in any direction. The rate of flow through the resins is adjusted to obtain effluent from the respective cation and anion exchange resin beds, or mixed bed thereof, having a pH within the aforesaid respective ranges. Generally, the flow rate is between about 20 and about 50 pounds of condensate per minute per cubic foot of exchange resin. It is to be understood, however, that the flow rate required for any given deionization to obtain the aforesaid pH values may be lower or higher and is governed by a variety of factors such as the particle size of the ion exchange resin, the dimensions of the ion exchange bed, the viscosity of the liquid condensate to be treated, the concentration of alkaline metal catalyst employed in the condensation reaction and the capacity of the ion exchange resins. Flow rate or recycling requirements are readily determined by sampling effluent from the respective columns to measure the pH thereof. In the event the pH responds to addition of ion exchange resin (that is, the pH is not substantially stable), the effluent may be recycled through the resin bed or the flow rate adjusted accordingly to achieve essentially complete deionization.

The ion exchange reactions are effected at temperatures between about 20° C. and about 75° C. and usually at a temperature no higher than about 60° C. Maximum temperatures of between about 30° C. and about 50° C. are quite suitable. Pressures do not appear to have a critical effect on the ion exchange reactions. While atmospheric pressure appears to be most convenient, increased or reduced pressures can also be used, as desired. In column operation, somewhat greater pressure at the inlet may be necessary to overcome the pressure drop within any given column, depending upon the flow resistance and tightness of the resin bed.

The cations which are removed from the resole during the cation exchange reaction include metal cations corresponding to those of the alkaline metal catalyst employed in the condensation reaction. By treatment of the condensate until the pH substantially stabilizes within the aforementioned range from about 1.5 to about 4, and preferably from about 2 to about 3.5, the content of alkaline metal cations derived from the catalyst (e.g., $Na^+$, $K^+$ or $Ba^{++}$) is reduced to essentially zero, that is, to less than about 100 parts per million, based on the weight of condensate and as determined by emission spectroscopy. It is to be understood, however, that other metal cations the nature of which is unknown, may also be exchanged with $H^+$ of the cation exchanger (such as, for example, cationic impurities present in the phenol, formaldehyde or catalyst or derived from the reactor) and may also have an adverse effect on resole shelf-life if not otherwise removed.

The nature of the anions which are removed during the anion exchange reaction has not been elucidated. It is postulated, however, that such anions may be derivatives of formic acid or benzoic acid. It is to be understood, however, that other theories may equally explain the reason for the discovery that, unless the cation exchanged resole is treated with anion exchange resin to a pH within the aforesaid range from about 4 to about 7, and preferably to a pH from about 4.5 to about 6.5, maximum resole stability towards irreversible self-condensation during aging is not achieved.

The ion exchanged resoles employed in the practice of the present invention are derived from base-catalyzed phenol-aldehyde condensates produced under the aforementioned condensation conditions. A generally preferred overall combination of condensation conditions are temperatures between about 70° C. and about 90° C., a reaction time from about one to about 4.5 hours, and catalyst concentrations from about 0.2 to about 4 weight percent (basis, phenolic compound).

From the standpoint of providing ion exchanged resoles having a particularly unique and outstanding combination of improved inherent stability and enhanced inherent reactivity as foamable compositions, the preferred condensation catalysts are compounds of potassium, cesium and francium. Of these, potassium compounds constitute the preferred class of catalysts, in view of their greater availability. Any of the various grades of potassium hydroxide available commercially are suitably employed as the condensation catalyst. These various grades include potassium hydroxide produced by electrolysis of potassium chloride in standard diaphragm electrolytic cells and in mercury cells. Also suitable as the condensation catalyst is potassium hydroxide, derived from either a diaphragm cell or a mercury cell, which has been subjected to further purification to reduce the content of potassium chloride and/or other impurities such as trace metals. Potassium hydroxide is also available in various physical forms and any of these are suitably employed including pellet, flake, walnut-shaped briquettes and so forth. From the standpoint of providing ion exchanged resoles which reproducibly provide phenolic foam of substantially reduced friability, potassium hydroxide made available as mercury cell grade is preferably employed. Illustrative of potassium hydroxide made available as mercury cell grade is that supplied by Hooker Chemical Corporation and Diamond Shamrock Chemical Company.

As previously described herein, the alkaline condensate is aqueous. In the preparation of the ion exchanged resoles, water present in the reaction system may be left in the condensate and passed as such to the above-described ion exchange reactions. Separation of aqueous distillate from condensate can be effected in several stages such as by effecting partial stripping prior to treatment with the cation exchanger and further stripping after treatment with the anion exchanger, or stripping can be effected in one stage such as after the anion exchange reaction. However, when the ion exchange reactions are effected employing individual beds of the respective exchange resins, the condensate should contain a sufficient amount of diluent prior to passage to the cation exchange reaction so that the resulting cation exchanged material which is acidic, undergoes minimize polymerization prior to removal of anions. For this purpose, the condensate should contain at least about 10, and usually at least about 20, weight percent of diluent. The diluent can be water introduced to the system as above-described, an added normally liquid, organic compound in which the resole is soluble, or a combination of water and added organic diluent. Suitable organic diluents include one or more of the following: alcohols such as, for example, isopropanol; ketones such as acetone and methyl ethyl ketone; water soluble ethers such as 1,2-dimethoxyethane (Monoglyme) and bis(2-methomyethyl)ether (Diglyme); esters such as methyl acetate; acetals such as dimethoxymethane and the dimethyl acetal of acetaldehyde; hemiacetals; and other such oxygen-containing polar liquids in which the resole is also soluble. Other suitable diluents include normally liquid, halogenated aliphatic compounds in which the resole is soluble. The latter class of diluents are exemplified by methylene chloride, chloroform, 1,2-dichloroethane, tetrachloroethylene, 1-bromo-2-chloroethane, hexachloro-1,3-butadiene, and chlorinated derivatives of the aforesaid oxygen-containing diluents such as hexachloroacetone. It is to be understood that methyl formate may also be introduced to the resole in this manner.

The ion exchanged resoles can be provided as aqueous or non aqueous compositions including non aqueous compositions which are either in concentrated form or dissolved in one of the aforesaid organic solvents. An especially suitable method for providing the ion exchanged resoles in anhydrous or substantially anhydrous form (0.5 weight percent water and less) comprises stripping alkaline condensate of aqueous distillate, adding isopropanol to the stripped condensate in an amount such that the combined weight of any remaining water and isopropanol is at least about 10 weight percent, subjecting the resulting mixture to the ion exchange reactions, and partially or completely stripping the deionized resole of isopropanol, as desired. During the latter operation, residual water is removed with isopropanol, thereby providing non aqueous products.

In the use of the ion exchanged resoles for the formation of phenolic foam as described herein, the water content thereof as well as the content of any added organic diluent, is reduced to a final level of not more than about 10, and preferably not more than about 6, weight percent. Usually, the concentration of water is reduced to between about 4 and about 0.5 or less weight percent. Minimizing water contents of foaming resoles is desirable in order to minimize shrinkage of the foam product. The initial viscosity of the ion exchanged resoles having such relatively low water contents, including the viscosity of non aqueous products, varies over a relatively wide range such as from about 400 up to about 150,000 centipoise (Brookfield at 25° C.), although usually initial viscosities are no higher than about 100,000 centipoise.

In addition to the above-described ion exchanged resoles and conventional resoles, the teachings of the present invention are also applicable to base-catalyzed phenol-aldehyde condensates which are treated with cation exchange resins followed by the addition thereto of an alkaline metal compound. In accordance with this latter method, the respective condensation and cation exchange reactions are effected under the above-described conditions but, in lieu of treatment with an anion exchange resin, an alkaline compound is added to the acidic cation exchanged material to raise the pH thereof to a value between about 5 and about 6.7. Suitable for this latter purpose are the alkaline metal compounds employed to catalyze the condensation rection. The resultant resoles are to be distinguished from the ion exchanged resoles described in the aforementioned application Ser. No. 595,744. Thus, the latter resoles are free of ionic species capable of being removed by the free acid form of a cation exchange resin and the free base form of an anion exchange resin and exhibit superior retention of reactivity as foamable compositions relative to resoles which are not free of such ionic species.

As previously disclosed herein, the 1,1,2-trichloro-1,2,2-trifluoroethane/methyl formate blowing agent of the present invention is used in an amount from about 2 to about 40 parts by weight per 100 parts by weight of resole and contains methyl formate in an amount from about 5 to about 80 weight percent with the proviso that at least 0.4 and no more than about 20 parts by weight of methyl formate are introduced to the foam formulation per 100 parts by weight of resole. Usually, the total amount of combined blowing agent is no more than about 20 and is more usually no more than about 16 parts by weight per 100 parts by weight of resole.

The amount of methyl formate present in the blends and foam formulations of the present invention is usually at least 0.5 and is more usually at least about one part by weight per 100 parts by weight of resole. The preferred maximum concentration of methyl formate is about 10 parts by weight per 100 parts by weight of resole.

It is to be understood that the 1,1,2-trichloro-1,2,2-trifluoroethane and methyl formate components of the blowing agent may be introduced to the foam formulation as individual streams, in preblended form, or one or both components may be added to the formulation in combination with the resole. In view of the effectiveness of methyl formate as a viscosity lowering additive, it is often desirable to add the methyl formate to the resole prior to use such that it is present during shipment or storage. For this purpose, the methyl formate may be added within the aforesaid amount of between about 0.4 and about 20 parts per 100 parts of resole, although usually no more than about 5 parts is required. Additional methyl formate (up to 20 parts per 100 parts of resole) and/or the 1,1,2-trichloro-1,2,2-trifluoroethane is then added during the foaming operation.

It also is to be understood that the blends and blowing agent of the present invention may contain other halogenated compounds such as, for example, trichloromonofluoromethane, as an auxiliary source of blowing action. When used, such additional halogenated blowing agents may be present in any amount up to a maximum of about 5 parts by weight per 100 parts by weight of resole, provided such additional blowing agents constitute no more than 30 weight percent of the combined total weight of blowing agent components. However, the presence of such additional blowing agents is usually minimized at zero or low levels of no more than 2 to 3 parts per 100 parts of resole.

In addition to the resole component and the blowing agent combinations provided by the present invention, for most end use applications of the phenolic foam product, the other components of the foam formulations usually include an acidic catalyst and a surface active agent.

The catalyst component of the foam formulation may be an inorganic acid or an organic acid and is usually a relatively strong acid added to the formulation as an aqueous solution. Illustrative of suitable acidic catalysts for foam polymer formation are any of the following: hydrochloric acid; sulfuric acid; fluoboric acid; formic acid; mixtures of acidic catalysts based on boric acid or its anhydride with organic hydroxy acids having a hydroxyl group on a carbon atom no more than one carbon atom removed from the carboxyl group such as, in particular, oxalic acid, as described in U.S. Pat. No. 3,298,973; and other acid catalysts known to the art of phenolic foam formation. Other suitable acidic catalysts are organic sulfonic acids such as any of the following which can be used individually or in combination with one another: benzene sulfonic acid, toluene sulfonic acid, xylene sulfonic acid, phenol sulfonic acid, ethane sulfonic acid, butane sulfonic acid and the like, as well as resin sulfonic acids such as the phenolsulfuric acid-formaldehyde reaction products described in British Patent No. 1,288,113. Illustrative of suitable mixtures of organic sulfonic acids for use as catalytic components of phenolic foam formulations containing the blowing agents of this invention, are modified toluene sulfonic acids such as that available as Ultra TX Acid and Sulframin TX Acid (Witco Chemical Company, Inc.).

Overall, the concentration of catalyst contained in the foaming reaction mixture may vary between about 0.5 and about 40 parts by weight per 100 parts by weight of the resole component, and usually no more than about 20 parts is used. The preferred concentration varies with the nature of the catalyst. For example, fluoboric acid is an especially active catalyst for phenolic foam formation and thus is usually used in an amount of no more than about 10 parts per 100 parts of resole.

One class of suitable surface active components of the phenolic foam formulations are organic surfactants. Particularly useful for this purpose are the non ionic organic surfactants such as condensation products of alkylene oxides (as illustrated by ethylene oxide, propylene oxide or combinations thereof) and alkylphenols such as nonylphenol, dodecylphenol and the like. Other suitable organic surface active agents are known to the phenolic foaming art and include, for example, those disclosed in U.S. Pat. No. 3,389,094, the teachings of which in this regard are incorporated as part of the present disclosure by reference thereto.

Another class of surface active agents are siloxane-oxyalkylene copolymers including those containing Si-O-C as well as Si-C linkages between the siloxane and oxyalkylene moieties. Typical siloxane-oxyalkylene copolymers contain a siloxane moiety composed of recurring dimethylsiloxy units endblocked with monomethylsiloxy and/or trimethylsiloxy units and at least one polyoxyalkylene chain composed of oxyethylene and/or oxypropylene units capped with an organic group such as alkyl. As specific examples of suitable siloxane-oxyalkylene polymers reference may be had to U.S. Pat. No. 3,271,331 the teachings of which in this regard are also incorporated herein by reference thereto.

Generally, the surface active agent is present in the foam formulations in an amount between about 0.5 and about 10 parts by weight per 100 parts by weight of the resole component. It is to be understood that the surface active agent may also be a component of the resole/methyl formate and the resole/methyl formate/1,1,2-trichloro-1,2,2-trifluoroethane blends of the present invention and may be added to the foam formulation in such preblended form.

In the practice of the present invention, the resole may be polymerized and foamed in the presence of other additives such as fillers, pigments, and compounds to render the foam product non punking. Illustrative of additives suitable for this latter purpose are the phosphorus-containing compounds described in U.S. Pat. No. 3,673,130 such as, in particular, tetrakis(hydroxymethyl)phosphonium chloride.

The examples set forth hereinbelow are illustrative of the present invention and are not to be construed as unduly limiting.

In the foam data of the examples and comparative runs, the resoles employed are referred to as Resoles A through H, J, I, II and III. Of these, Resoles A through H and J are illustrative of those described in my aforementioned copending application Ser. No. 595,744, filed July 14, 1975, and were prepard by treatment of phenol-formaldehyde condensates with cation and anion exchange resins. Resole I were prepared by treatment of condensate with cation exchange resin only, followed by the addition thereto of alkali to raise the pH of the cation exchanged material. Remaining Resoles II and III are illustrative of conventional phenol-formaldehyde foamable resoles prepared without the employment of ion exchange resins and are described under Examples 15 to 18 (Resole II) and 24 (Resole III). The details of the methods by which Resoles A through H, J and I were prepared are given below where, for the sake of brevity, the ion exchange resins and potassium hydroxide catalyst employed are identified as follows:

Cation exchange Resin A is Rohm and Haas Company's free acid ($H^+$) form of Amberlite IR-120. Cation exchange Resin B is Rohm and Haas Company's Amberlite IR-200 which, prior to use, was converted to its free acid form by the following procedure: About 1300 ml. of the IR-200 resin contained in a column (7 cm. I.D., 36 inches in length) is backflushed with one gallon of 4.0 weight percent hydrochloric acid, is then allowed to stand for 10-15 minutes while the resin bed settles, and is then flushed downwardly with distilled water (about 3-4 gallons) until the effluent is neutral to pH paper.

Anion exchange Resin A is Amberlite IRA-900 also marketed by Rohm and Haas Company. It is supplied in the chloride form and thus prior to use it was converted to the $OH^-$ form substantially as follows: One gallon of the resin is slurried with 3 percent aqueous potassium hydroxide solution (one gallon) in a four-liter beaker for 30 minutes. The pH of the slurry is measured to ascertain alkalinity. The resin is then suction-filtered and washed batchwise with distilled water (about five gallons) until a constant neutral pH is obtained.

Potassium hydroxide Catalyst A is that sold by J. T. Baker and Company as "Potassium Hydroxide Pellets, 'Baker Analyzed' Reagent" (purity, about 85-89 weight percent). The assay of the particular pellets used in the resole preparations was 85.9 or 86.2 percent.

Potassium hydroxide Catalyst B is that available in flake form from Hooker Chemical Corporation as Caustic Potash, Mercury Cell Grade (KOH, 90% minimum).

The values reported for the viscosity, pH and water content of the resole preparations were determined substantially as follows:

Viscosity, reported in centipoise (cps), was determined in Brookfield Viscometer Model LVT. Measurements were made by placing the resole sample in a constant temperature bath (25° C. unless indicated otherwise) for 16 hours, using an appropriate spindle (No. 3 or No. 4).

The pH determinations were made employing Beckman Zeromatic pH Meter (Beckman Instruments, Inc.), Model 96.

Water content of the resoles was determined in accordance with the method of Karl Fischer modified by the use of a Methyl Cellosolve solution of sulfur dioxide and iodine ($I_2$) as the titrating reagent standardized to a particular iodine factor (about 0.2) which is the grams of water consumed by 100 ml. of reagent. The method is further modified to determine the endpoint of the titration electrometrically using a microampere meter. As the solvent medium, either anhydrous methanol/redistilled pyridine (50 ml./75 ml.) or anhydrous methanol is used. The titrating reagent is added to the solvent medium until the indicator of the meter holds at a maximum value (e.g., 100 or 150 microamperes) which is taken as the endpoint of this standardization step. The sample (0.5-1.0 gram) to be analyzed is then added to the same solvent medium employed in the standardization step and is titrated with the reagent until the indicator again holds at the previously determined endpoint. The water content of the sample is then calculated as follows.

$$\frac{A \times \text{Iodine Factor}}{\text{Grams of Sample}} = \text{Weight Percent Water}$$

where A is the number of milliliters of titrating reagent required for the sample to reach the endpoint.

IDENTIFICATION OF RESOLES

RESOLE A:

This resole was prepared at a formaldehyde factor of 170 (1600 grams of phenol and 2740 grams of 37 weight percent aqueous formaldehyde) in the presence of 16 grams of potassium hydroxide Catalyst A dissolved in 188 grams of distilled water for a period of 3.25 hours at 85° C. under reduced pressure (475-525 mm. mercury). After the condensation reaction, the pH of the condensate (cooled to 45° C.) was 7.7. The condensate (4522 grams) was then slurried with cation exchange Resin A (350 grams) until the pH of the slurry stabilized at 2.5 which took about 14 minutes. The slurry was then filtered and the filtrate combined with anion exchange Resin A (1000 grams) for about 32 minutes. After this period, the pH of the slurry was 5.45. The anion exchange resin was separated by filtration and the filtrate was stripped of aqueous distillate (2299 grams) at about 48°-60° C. (100-60 mm. Hg) and a final condition of 65° C./15 mm. Hg. The remaining liquid product (1990 grams), designated herein as Resole A, had a Brookfield viscosity at 25° C. of 85,000 centipoise and a water content of 1.25 weight percent.

RESOLE B

This resole was prepared in substantially the same manner and under the same conditions as Resole A. thus, the condensation reaction was effected at a formaldehyde factor of 170 (1600 grams of phenol and 2740 grams of 37 weight percent aqueous formaldehyde) in the presence of 16 grams of potassium hydroxide Catalyst A dissolved in 188 grams of distilled water for a period of 3.25 hours at 85° C. (480-525 mm. Hg pressure). After the condensation reaction, the pH of the condensate (cooled to 45° C.) was 7.7. The condensate (4490 grams) was then slurried with cation exchange Resin A (350 grams) until the pH of the slurry stabilized at 2.5 which took about 16 minutes. The slurry was then filtered and the filtrate combined with anion exchange Resin A (1000 grams) for about 40 minutes. After this period, the pH of the slurry was 5.45. The anion exchange resin was separated by filtration and the filtrate was stripped of aqueous distillate (2216 grams) at about 48°-51° C. (100-85 mm. Hg) and a final condition of 65° C./15 mm. Hg. The remaining liquid product (2130 grams), designated herein as Resole B, had a Brookfield viscosity at 25° C. of 66,000 centipoise and a water content of 1.29 weight percent.

RESOLE C THROUGH F

This series of resoles were prepared at a formaldehdye factor of 170 (1600 grams of phenol and 2740 grams of 37 weight percent aqueous formaldehyde) in the presenc of 16 grams of potassium hydroxide Catalyst B dissolved in 188 grams of distilled water. In the preparation of Resoles C and D, the condensation reactions were carried out for 3 hours and 15 minutes at 85° C. and a reduced pressure of 460–505 mm. Hg. In the preparation of Resoles E and F, the condensation reactions were effected for 3 hours and 20 minutes at 85° C. and a reduced pressure of 460–510 mm. Hg (Resole E) and 460–500 mm. Hg (Resole F). After the respective condensation reactions, the pH of the warm (about 35°–45° C.) respective condensates was measured (7.1, 7.8, 7.7 and 7.75, respectively). Each of the individual condensates was then slurried with 300 grams of cation exchange Resin A until the pH of the slurry was lowered to 2.7–2.75. After filtering, the cation-exchanged filtrates were slurried with anion exchange Resin A (700, 768, 650 and 760 grams, respectively) until the pH of the respective mixtures was raised to 5.5. The ion-exchanged products were then stripped of aqueous distillate at elevated temperature and reduced pressure. The stripping conditions were: 50°–54° C./115–100 mm. Hg (Resole C); 51°–54° C./100–100 mm. Hg (Resole D); 50°–55° C./105–60 mm. Hg (Resole E); and 50°–55° C./105–70 mm. Hg (Resole F). The final condition of each stripping operation was 65° C./40 mm. Hg. The grams of resole product recovered in each preparation is as follows where the total grams of aqueous distillate collected is given in parenthesis: Resole C, 2117 (2081); Resole D, 2141 (2097); Resole E, 1950 (2175); and Resole F, 2155 (2065). The viscosity (Brookfield at 26° C.) and water contents of the respective products is as follows:

Resole C 86,000 centipoise
1.71 weight percent water.

Resole D 104,000 centipoise
1.80 weight percent water.

Resole E 108,000 centipoise
1.59 weight percent water.

Resole F 82,000 centipoise
1.68 weight percent water.

RESOLE G

Two condensates were prepared employing in each preparation, 1600 grams of phenol and 2740 grams of a 37.3 weight percent aqueous solution of formaldehyde (factor, 170) and a solution containing 32.3 grams of potassium hydroxide Catalyst A dissolved in 188 grams of distilled water. The respective condensation reactions were carried out at 75° C. (300–315 mm. mercury) for about 3.25 hours. After the condensation reaction, partial removal of water was effected (about 45° C./80–65 mm. mercury) until about 64 grams of aqueous distillate per 100 grams of phenol had been collected in each preparation. The partially dehydrated, alkaline condensates (pH, 8.5; water content, about 25 weight percent) were next combined with cation exchange Resin B and the resulting slurries were stirred until the pH stabilized at 3.1 and 3.0, respectively. After filtering to remove the cationic resin, the filtrates were combined with anion exchange Resin A until the pH of the respective slurries were 4.6 and 4.4. After separation of the resin, the pH of the filtrates were 4.95 and 4.70, respectively. The products were subjected to further stripping to remove additional aqueous distillate after which the remaining liquid products were combined. The combined product had a pH of 4.85 and was subjected to further stripping (46°–65° C./65–60 mm. mercury). After this final stripping operation, the residual product, referred to as Resole G-1, had a viscosity of 12,800 centipoise at 25° C. and a water content of 3.23 weight percent. As a result of a heat aging study carried out at 65° C., atmospheric pressure and under nitrogen for respective total periods of 5, 11.5 and 18 hours, three additional samples were provided and, for convenience, are referred to as Resoles G-2, G-3 and G-4, respectively. Their viscosities were (centipoise at 25° C.): 14,520 (G-2), 20,892 (G-3) and 26,000 (G-4). Each of the heat aged resoles as well as the freshly prepared resole (G-1), were then aged at ambient temperatures in a closed glass container for a total of 588 days. After this protracted aging period, the viscosity of these materials were (centipoise at 25° C.): 350,000 (G-1), 300,000 (G-2), 510,000 (G-3) and 670,000 (G-4). These highly viscous resoles were then combined. The combined product is assigned an approximated viscosity of 500,000 centipoise at 25° C., and is referred to herein as Resole G.

RESOLE H

In this preparation, phenol and formaldehyde were condensed at a formaldehyde factor of 170 (1600 grams of phenol and 2740 grams of 37 weight percent aqueous formaldehyde) in the presence of 16 grams of potassium hydroxide Catalyst A dissolved in 188 grams of distilled water, for a period of 3.25 hours at 85° C. (470–525 mm. Hg pressure). The alkaline condensate (4541 grams) was then passed through a tower containing 1300 ml. of cation exchange Resin B over a period of 19 minutes. The cation exchanged effluent (pH = 2.7) was then slurried with anion exchange Resin A (476 grams) for 14 minutes after which the pH of the slurry had increased to 5.5. The ion exchanged liquid was then stripped of aqueous distillate (2271 grams) at about 51° to 50° C. (120 to 90 mm. mercury pressure) and a final condition of 65°–59° C. at 30–20 mm. mercury. The remaining liquid product (1735 grams) is referred to a Resole H-1. Another resole was prepared in a substantially duplicate run. In the second preparation, the condensation was carried out on the same scale employing the same reactants and catalyst for 3.25 hours at 85° C. (470–530 mm. mercury pressure). After the cation exchange reaction, the ph of the condensate was reduced to 2.8 and, after the anion exchange reaction, the pH was 5.5. After separation of aqueous distillate (2209 grams), the remaining product (2229 grams), referred to as Resole H-2, was combined with Resole H-1. The combined product is designated herein as Resole H and had a water content of 2.43 weight percent.

RESOLE J

In this preparation, the resole was produced on a pilot plant scale effecting deionization in fixed beds of ion exchange resins in columns. The condensation was effected in a stainless steel reactor provided with a condenser and agitator employing: 171 pounds of phenol and 293 pounds of aqueous formaldehyde solutin (37 weight percent), the formaldehyde factor being about 170; and an aqueous solution containing 1.7 pounds of potassium hydroxide Catalyst B dissolved in 12 pounds of water. The condensation reaction was effected at 85° C. for 3 hours under reduced pressure appropriately adjusted to control the reaction temperature at 85° C. The condensate was cooled to about 30°–35° C. and discharged to a drum. The condensate had a pH of 8.1 and a water content of 36.9 weight percent. A portion (3500 grams) was removed for preparation of Resole I described hereinbelow. The remainder of the condensate was then passed downwardly through a bed of about 100 pounds of cation exchange Resin A contained in a plastic-lined tower (9.5 feet × 8 inches I.D.). The effluent from the cation exchange tower had a pH of 2.3 and was then passed downwardly through a bed of about 160 pounds of anion exchange Resin A contained in a stainles steel tower (8 feet × 12 inches I.D.). The effluent from the anion exchange tower had a pH of 5.5 and was stripped of aqueous distillate under typical conditions (e.g., 50°–60° C./60–25 mm. mercury). The resole product, referred to as Resole J-1, was obtained in a yield of about 100 pounds per 100 pounds of phenol charged. Upon analysis, Resole J-1 was found to have a water content of 1.63 weight percent and a Brookfield viscosity (25° C.) of 156,000 centipoise. After heating Resole J-1 for a total period of 12 hours at 65° C., its viscosity was 680,000 centipoise (at 25° C.). The heat aged, highly viscous material is referred to herein as Resole J.

RESOLE I

In this preparation, a 3500 gram portion of the same condensate described under the preparation of Resole J was treated with 1000 grams of cation exchange Resin A until the pH of the slurry stabilized at 2.4. The cation exchange resin was removed by filtration and, in lieu of treatment with anion exchange resin, the filtrate was treated dropwise with a twelve weight percent solution of potassium hydroxide until the pH reached 5.5 which required about 25 grams of the KOH solution. Aqueous distillate (1646 grams) was then separated from the resole at a head temperature of 50°–40° C. under reduced pressure (95–40 mm. mercury) over a period of about 2.75 hours. The remaining resole product (1740 grams) had a viscosity of 200,000 centipoise (Brookfield at 25° C.) and a water content of 5.44 weight percent. This product is referred to as Resole I-1. After heat aging Resole I-1 for a total period of 12 hours at 65° C., its viscosity was too high to measure and thus is estimated at over one million centipoise. The heat aged, highly viscous material is referred to herein as Resole I.

In the phenolic foam preparations described in the examples and comparative runs which follow, the foam formulations, designated Formulations A and B, had the respective compositions given in the following Table I.

TABLE I

| FOAM FORMULATIONS A AND B | | |
|---|---|---|
| | Parts By Weight | |
| Component | A | B |
| Resole | 300 | 300 |
| Silicone Surfactant /1/ | 3 | 3 |
| Catalyst: | | |
| Fluoboric acid as a 48 weight percent aqueous solution | Varied | 0 |
| Phenolsulfonic acid as a 65 weight | 0 | 18 |

TABLE I-continued

| FOAM FORMULATIONS A AND B | | |
|---|---|---|
| | Parts By Weight | |
| Component | A | B |
| percent aqueous solution | | |
| Blowing Agent: | | |
| 1,1,2-Trichloro-1,2,2-trifluoro-ethane | Varied | Varied |
| Methyl formate | Varied | Varied |

/1/ A polysiloxane-polyoxyalkylene block copolymer having the average composition $$Me_3SiO[Me_2SiO]_{68}[MeSiO]_{6.7}SiMe_3$$
$$\phantom{MeO(C_3H_6O)..}|$$
$$MeO(C_3H_6O)_{8.7}(C_2H_4O)_{22.4}C_3H_6$$

GENERAL FOAMING PROCEDURE

The foams of the examples and comparative runs were prepared following substantially the same manipulative steps. A typical procedure is as follows: The 300 parts by weight charge of resole, the silicone surfactant and blowing agent are weighed successively into a cardboard container having a capacity of one quart. The mixture is blended by stirring with an air driven motor equipped with a stainless steel shaft containing three stainless steel paddles; the temperature of this mixture is within the range of 27° to 30° C. Blending is continued until a uniform creamy mixture is obtained which state is usually achieved in 30 to 60 seconds. A preweighed amount of catalyst solution is then poured on top of the premixture and the whole stirred vigorously for 20 seconds. The resultant blend is poured into a cardboard box (8 inches × 8 inches × 6 inches), the cream and rise times (in seconds) recorded, and the foam height (in inches) measured. The cream time is taken as the time from catalyst addition until the blend visibly begins to expand. Rise time is measured from the time of catalyst addition until expansion ceases. The height of rise is measured as of the indicated rise time. The foams are allowed to stand at ambient conditions for at least 24 hours before cutting. Determination of physical properties is usually made three days after the initial foam preparation.

The compressive strength of the foam products is reported in pounds per square inch (psi.) and was determined in accordance with ASTM D-1621.

The core density of the foam products is reported in pounds per cubic foot (pcf.) and was determined in accordance with ASTM D-1632.

Friability resistance was measured using a combination of ASTM C-367 and C-421 tumbling tests, that is, the test specimens are conditioned at room temperature with one inch wooden cubes in accordance with ASTM C-367, and the test time intervals (after 2 and 8 minute periods for a total of 10 minutes) were in compliance with ASTM C-421.

It is noted that foam density and foam friability bear an inverse relationship to one another. Thus, as between any two foam samples having different densities, the foam having the higher density will have the lower friability. Likewise, the foam of lower density will be more friable. In view of this relationship between density and friability and, as indicated in foam data which follows, the determined values for the 10 minute weight loss measure of friability have been converted to a common density basis by normalization to either 1.50 or 2.00 pounds per cubic foot. The calculation is a simple one. For example, the normalized value of a determined weight loss of 50 percent for a foam having a core density of 1.75 pcf. is 43.8 percent at 2.00 pcf. and 58.3 at 1.50 pcf.

EXAMPLES 1 AND 2

In accordance with these examples, a series of phenolic foams were prepared employing above-described ion exchanged Resoles A and B as the respective resole components of Foam Formulation A defined in Table I. In these examples, the blowing agent consisted of 70 weight percent of 1,1,2-trichloro-1,2,2-trifluoroethane and 30 weight percent of methyl formate, and was used in a total amount of 30 parts by weight, based on the 300 parts by weight charge of resole (or 10 parts per one hundred parts of resole). For the purpose of comparison, foams were also prepared as Run Nos. C-1 to C-4 employing Resoles A and B as the resole component of Foam Formulation A except that methyl formate was not employed. In these comparative runs, the trichlorotrifluoroethane was employed as the sole blowing agent in a total amount of 39 or 30 parts by weight. In the foam preparations of the examples and comparative runs, the aqueous fluoboric acid catalyst solution was used in a total amount of 9 parts by weight. The results including the reactivity data and foam properties are given in the following Table II.

chloro-1,2,2-trifluoroethane/methyl formate combination, had substantially improved friability resistance relatively to that of comparative Foams 1, 2, 4 and 5 which were also derived from ion exchanged Resoles A and B but were blown with 1,1,2-trichloro-1,2,2-trifluoroethane only. Thus, the values of the 10 minute weight loss, normalized to a foam density of 1.50 pcf., were 38.7 and 43.7 percent for respective Foams 3 and 6, whereas for Foams 2 and 5 of comparative Runs C-2 and C-4 in which the total amount of blowing agent was also 30 parts by weight, the corresponding normalized 10 minute weight loss values were 64.1 and 66.6 percent, respectively.

EXAMPLES 3 to 6

In accordance with these examples, a series of phenolic foams were prepared employing above-described ion exchanged Resoles C, D, E and F as the respective resole components of Foam Formulation A defined in Table I. In these examples, the blowing agent was also constituted of 70 weight percent of 1,1,2-trichloro-1,2,2-trifluoroethane and 30 weight percent of methyl formate, and was used in a total amount of 30 parts by weight. The reactivity data and foam properties are given in Table III hereinbelow. The latter table includes additional data as Run Nos. C-5 to C-8 in which foams were also prepared employing ion exchanged Resoles C

TABLE II

| Example No. | — | — | 1 | — | — | 2 |
|---|---|---|---|---|---|---|
| Run No. | C-1 | C-2 | — | C-3 | C-4 | — |
| Foam No. | 1 | 2 | 3 | 4 | 5 | 6 |
| Foam Formulation A /1/ | | | | | | |
| Resole | A | A | A | B | B | B |
| Catalyst, pts. by wt. | 9 | 9 | 9 | 9 | 9 | 9 |
| Blowing agent, pts. by wt. | | | | | | |
| A. Trichlorotrifluoroethane | 39 | 30 | 21 | 39 | 30 | 21 |
| B. Methyl formate | 0 | 0 | 9 | 0 | 0 | 9 |
| Weight ratio A:B | 100/0 | 100/0 | 70/30 | 100/0 | 100/0 | 70/30 |
| Cream time, seconds | 18 | 20 | 25 | 20 | 20 | 25 |
| Rise time, seconds | 90 | 65 | 100 | 100 | 65 | 95 |
| Tack free time, seconds | 80 | 60 | 85 | 90 | 60 | 80 |
| Rise height, inches | 7.5 | 7.5 | 8.5 | 7.5 | 7.5 | 8 |
| Shrinkage | trace | trace | ¼" | trace | none | ¼" |
| Foam Properties | | | | | | |
| Core density, pcf. | 1.62 | 1.61 | 1.53 | 1.64 | 1.58 | 1.68 |
| Compressive strength, psi. (25° C.) | | | | | | |
| Parallel | 16.3 | 16.8 | 18.9 | 15.3 | 17.3 | 17.0 |
| Perpendicular | 10.5 | 10.5 | 10.4 | 11.4 | 9.9 | 10.1 |
| Friability, % weight loss | | | | | | |
| After 2 minutes | 11.5 | 9.3 | 6.4 | 18.4 | 11.2 | 13.4 |
| After 10 minutes | 64.4 | 59.7 | 37.9 | 75.6 | 63.2 | 39.0 |
| 10 minute weight loss, normalized to 1.50 pcf. | 69.6 | 64.1 | 38.7 | 82.7 | 66.6 | 43.7 |

/1/ As defined in Table I based on 300 parts by weight of resole.

The results of Examples 1 and 2 of the foregoing Table II demonstrate the effectiveness of methyl formate in combination with 1,1,2-trichloro-1,2,2-trifluoroethane as a blowing agent in the formation of phenolic foam. The data of Table II also show that Foams 3 and 6 which were derived from ion exchanged Resoles A and B and blown with a 70/30 1,1,2-trito F as the respective resole components of Foam Formulation A except that the blowing agent consisted of the trichlorotrifluoroethane and was employed in a total amount of 39 parts by weight. In each foam preparation, the aqueous fluoboric acid catalyst was used in a total amount of 9 parts by weight. Table III follows.

TABLE III

| Example No. | — | 3 | — | 4 | — | 5 | — | 6 |
|---|---|---|---|---|---|---|---|---|
| Run No. | C-5 | — | C-6 | — | C-7 | — | C-8 | — |
| Foam No. | 7 | 8 | 9 | 10 | 11 | 12 | 13 | 14 |
| Foam Formulation A /1/ | | | | | | | | |
| Resole | C | C | D | D | E | E | F | F |
| Catalyst, pts. by wt. | 9 | 9 | 9 | 9 | 9 | 9 | 9 | 9 |
| Blowing agent, pts. by wt. | | | | | | | | |
| A. Trichlorotrifluoroethane | 39 | 21 | 39 | 21 | 39 | 21 | 39 | 21 |
| B. Methyl formate | 0 | 9 | 0 | 9 | 0 | 9 | 0 | 9 |
| Weight ratio A:B | 100/0 | 70/30 | 100/0 | 70/30 | 100/0 | 70/30 | 100/0 | 70/30 |
| Cream time, seconds | 30 | 35 | 30 | 30 | 25 | 30 | 25 | 30 |
| Rise time, seconds | 90 | 100 | 75 | 100 | 80 | 100 | 70 | 95 |
| Tack free time, seconds | 60 | 150 | 55 | 145 | 50 | 140 | 55 | 145 |
| Rise height, inches | 7.5 | 6.5 | 7.5 | 7.5 | 7.5 | 7 | 8.5 | 7 |

TABLE III-continued

| | | | | | | | | |
|---|---|---|---|---|---|---|---|---|
| Shrinkage, inches | trace | ½ | none | ¼ | slight | ¼ | ¼ | ¼ |
| Foam Properties | | | | | | | | |
| Core density, pcf. | 1.51 | 1.80 | 1.59 | 1.79 | 1.63 | 1.83 | 1.42 | 1.58 |
| Compressive strength, psi. (25° C.) | | | | | | | | |
| Parallel | 18.3 | 21.3 | 20.5 | 22.8 | 20.5 | 24.6 | 15.5 | 21.1 |
| Perpendicular | 9.9 | 10.4 | 10.3 | 13.1 | 10.8 | 14.3 | 8.0 | 11.1 |
| Friability, % weight loss | | | | | | | | |
| After 2 minutes | 4.49 | 2.59 | 5.45 | 4.97 | 8.42 | 5.23 | 5.67 | 6.29 |
| After 10 minutes | 41.00 | 25.30 | 42.50 | 29.80 | 49.30 | 33.50 | 43.00 | 35.20 |
| 10 minute weight loss, normalized to 1.5 pcf. | 41.2 | 30.4 | 45.6 | 35.6 | 53.6 | 40.9 | 40.7 | 37.2 |

/1/ As defined in Table I based on 300 parts by weight of resole.

The data of Table III further demonstrate the effectiveness of methyl formate in combination with 1,1,2-trichloro-1,2,2-trifluoroethane as a blowing agent for phenolic foam.

EXAMPLES 7 to 12

In these examples, another series of phenolic foams were prepared employing respective ion exchanged Resoles A to F as the resole component of Foam Formulation A defined in Table I. In each foam preparation, the blowing agent was used in a total amount of 30 parts by weight of which 80 weight percent was 1,1,2-trichloro-1,2,2-trifluoroethane and 20 weight percent was methyl formate. The concentration of aqueous fluoboric acid catalyst was higher than in previous Examples 1 to 6 and was 12 parts by weight. The reactivity data and foam properties are given in the following Table IV.

EXAMPLES 13 and 14

In accordance with these examples, phenolic foams were prepared employing ion exchanged Resole F as the resole component of Foam Formulation A defined in Table I. In Example 13, the blowing agent was constituted of 50 weight percent of each of 1,1,2-trichloro-1,2,2-trifluoroethane and methyl formate. In Example 14, the blowing agent contained 80 weight percent of methyl formate and 20 weight percent of the trichlorotrifluoroethane. Two comparative foams were also prepared employing, as the sole blowing agent, 1,1,2-trichloro-1,2,2-trifluoroethane (Run No. C-9) and methyl formate (Run No. C-10), respectively. In each preparation the concentration of the aqueous solution of fluoboric acid catalyst was 12 parts by weight. The results are given in Table V. Also included in Table V are the results of Example 11 (Foam No. 19) of Table

TABLE IV

| Example No. | 7 | 8 | 9 | 10 | 11 | 12 |
|---|---|---|---|---|---|---|
| Run No. | — | — | — | — | — | — |
| Foam No. | 15 | 16 | 17 | 18 | 19 | 20 |
| Foam Formulation A /1/ | | | | | | |
| Resole | A | B | C | D | E | F |
| Catalyst, pts. by wt. | 12 | 12 | 12 | 12 | 12 | 12 |
| Blowing agent, pts. by wt. | | | | | | |
| A. Trichlorotrifluoroethane | 24 | 24 | 24 | 24 | 24 | 24 |
| B. Methyl formate | 6 | 6 | 6 | 6 | 6 | 6 |
| Weight ratio A:B | 80/20 | 80/20 | 80/20 | 80/20 | 80/20 | 80/20 |
| Cream time, seconds | 12 | 15 | 25 | 25 | 20 | 20 |
| Rise time, seconds | 40 | 50 | 60 | 55 | 55 | 55 |
| Tack-free time, seconds | 40 | 45 | 80 | 80 | 75 | 80 |
| Rise height, inches | 8.5 | 8.5 | 7.5 | 7.5 | 7.5 | 8 |
| Shrinkage | trace | none | trace | slight | slight | slight |
| Foam Properties | | | | | | |
| Core density, pcf. | 1.48 | 1.40 | 1.63 | 1.59 | 1.64 | 1.63 |
| Compressive strength, psi. (25° C.) | | | | | | |
| Parallel | 16.0 | 11.9 | 20.8 | 19.3 | 21.1 | 20.4 |
| Perpendicular | 9.9 | 7.6 | 11.3 | 9.3 | 11.8 | 10.9 |
| Friability, % weight loss | | | | | | |
| After 2 minutes | 8.5 | 14.6 | 2.78 | 7.00 | 6.96 | 6.60 |
| After 10 minutes | 50.5 | 70.8 | 28.60 | 44.60 | 42.60 | 35.80 |
| 10 minute weight loss, normalized to 1.50 pcf. | 49.8 | 66.1 | 31.1 | 47.7 | 46.6 | 38.9 |

/1/ As defined in Table I based on 300 parts by weight of resole.

The data of Table IV demonstrate the efficacy of the blowing agent of the present invention containing 20 weight percent of methyl formate in the formation of phenolic foam.

IV which, as previously described, are based on foaming of ion exchanged Resole E with blowing agent containing 20 weight percent of methyl formate and 80 weight percent of the trichlorotrifluoroethane. Table V follows.

TABLE V

| Example No. | — | 11 | 13 | 14 | — |
|---|---|---|---|---|---|
| Run No. | C-9 | — | — | — | C-10 |
| Foam No. | 21 | 19 | 22 | 23 | 24 |
| Foam Formulation A /1/ | | | | | |
| Resole | F | E | F | F | F |
| Catalyst, pts. by wt. | 12 | 12 | 12 | 12 | 12 |
| Blowing agent, pts. by wt. | | | | | |
| A. Trichlorotrifluoroethane | 30 | 24 | 15 | 6 | 0 |
| B. Methyl formate | 0 | 6 | 15 | 24 | 30 |
| Weight ratio A:B | 100/0 | 80/20 | 50/50 | 20/80 | 0/100 |
| Cream time, seconds | 20 | 20 | 25 | 25 | 60 |
| Rise time, seconds | 50 | 55 | 85 | 85 | 95 |

TABLE V-continued

| | | | | | |
|---|---|---|---|---|---|
| Tack-free time, seconds | 40 | 75 | 100 | 100 | 80 |
| Rise height, inches | 7.5 | 7.5 | 7.0 | 7.0 | 5.0 |
| Shrinkage | none | slight | 1/16" | 1/16" | none |
| Foam Properties | | | | | |
| Core density, pcf. | 1.93 | 1.64 | 1.94 | 2.12 | 3.09 |
| Compressive strength, psi (25° C.) | | | | | |
| Parallel | 19.6 | 21.1 | 18.7 | 20.2 | 27.6 |
| Perpendicular | 10.9 | 11.8 | 12.4 | 12.4 | 19.4 |
| Friability, % weight loss | | | | | |
| After 2 minutes | 6 | 6.96 | 6 | 7 | 13 |
| After 10 minutes | 35.8 | 42.60 | 28.8 | 41.0 | 60.9 |
| 10 minute weight loss, normalized to 2.00 pcf. | 34.6 | 34.9 /2/ | 27.9 | 43.5 | 94.1 |

/1/ As defined in Table I based on 300 parts by weight of resole.
/2/ Values of 10 minute % weight loss, normalized to 2.00 pcf., for Foams 17, 18 and 20 (Table IV) which are based on corresponding Resoles C, D and F are: 23.3, 35.8 and 29.2, respectively; average for Foams 17 to 20 = 30.8%.

Figure 1:
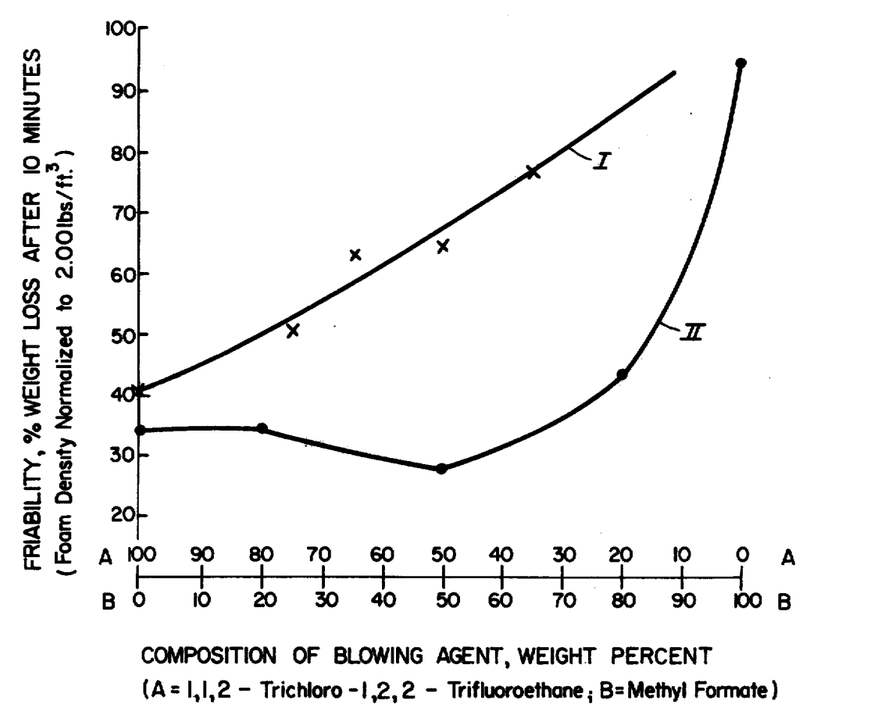
The accompanying drawing shows the relationship between blowing agent composition and the friability resistance of respective foams derived from conventional resoles (line labeled I) and ion exchanged resoles (line labeled II). This figure and the data on which it is based are discussed in greater detail in the context of Examples 13 to 18 hereinbelow.

Inspection of the data of Table V shows that the use of methyl formate as the sole blowing agent for phenolic foam has a very severe adverse effect on foam friability. Thus, in Run C-10, all methyl formate-blown Foam 24 had a foam density of 3.09 pcf. and a determined 10 minute weight loss of 60.9 percent which, when normalized to a foam density of 2.00 pcf., corresponds to a weight loss of 94.1 percent. The latter value is more than twice as high as the corresponding normalized 10 minute weight loss (43.5 percent) for Foam 23 of Example 14 the blowing agent of which is within the present invention and contained 80 weight percent of methyl formate in combination with 1,1,2-trichloro-1,2,2-trifluoroethane. The data of Table V also show that the 50/50 methyl formate/1,1,2-trichloro-1,2,2-trifluoroethane combination employed as the blowing agent in Example 13 provided phenolic foam of substantially improved friability resistance relative to that of Foam 21 (Run C-9) which was blown solely with 1,1,2-trichloro-1,2,2-trifluoroethane. The 10 minute weight loss measurements, normalized to the common foam density basis of 2.00 pcf., given in Table V form the basis of line labeled II of the accompanying drawing. Although the ability of particular 1,1,2-trichloro-1,2,2-trifluoroethane/methyl formate combinations to provide phenolic foam of improved friability resistance is observed when used as the source of blowing action for formulations containing the ion exchanged resoles, a similar improvement in friability resistance is not observed in regard to foam derived from conventional resoles as demonstrated by data included under the following examples.

EXAMPLES 15 TO 18

In these examples, a series of phenolic foams was prepared employing a conventional phenol-formaldehyde resole, designated herein as Resole II, which is designed for manufacture of medium density (1.5–2.5 pcf.) rigid phenolic foam. In the manufacture of Resole II, the phenol-formaldehyde condensation is effected using barium hydroxide catalyst and the alkaline condensate is neutralized with dilute sulfuric acid. The resultant solubilized barium salt is probably in a solvated form and, in any event, remains in the resole as a component thereof. As manufactured, Resole II had the following properties: a viscosity of about 2400 centipoise at 25° C.; a pH of 6.5; a foam density specification of 2.0 pcf. and a solids content of 80 weight percent, the estimated water content being no more than about 8 weight percent. Resole II is highly heat reactive under ordinary storage conditions and thus it is normally recommended that it be stored below about 7° C. Prior to use in the foam preparations of these examples, Resole II had been stored under refrigeration (about 5° C.) and, as used, had a viscosity of 3950 centipoise at 25° C. In the foam preparations of these examples, Resole II was used as the resole component of Foam Formulation A and the methyl formate content of the 1,1,2-trichloro-1,2,2-trifluoroethane/methyl formate blowing agent was 25, 35, 50 and 65 weight percent, respectively. For the purpose of comparison, two additional foams were prepared (Run Nos. C-11 and C-12) based on Resole II except that in place of employing a combination of the trichlorotrifluoroethane and methyl formate, these compounds were used individually as the respective sole blowing agents. In each foam preparation the aqueous solution of fluoboric acid catalyst was employed in a total amount of 21 parts by weight. The results are given in the following Table VI.

TABLE VI

| Example No. | — | 15 | 16 | 17 | 18 | — |
|---|---|---|---|---|---|---|
| Run No. | C-11 | — | — | — | — | C-12 |
| Foam No. | 25 | 26 | 27 | 28 | 29 | 30 |
| Foam Formulation A /1/ | | | | | | |
| Resole | II | II | II | II | II | II |
| Catalyst, pts. by wt. | 21 | 21 | 21 | 21 | 21 | 21 |
| Blowing agent, pts. by wt. | | | | | | |
|   A. Trichlorotrifluoroethane | 40 | 30 | 26 | 20 | 14 | 0 |
|   B. Methyl formate | 0 | 10 | 14 | 20 | 26 | 40 |
|   Weight ratio A:B | 100/0 | 75/25 | 65/35 | 50/50 | 35/65 | 0/100 |
| Cream time, seconds | 80 | 180 | 100 | 120 | 135 | 300 |
| Rise time, seconds | 240 | 310 | 345 | 380 | 400 | 320 |
| Tack-free time, seconds | 160 | 250 | 245 | 265 | 430 | 380 |
| Rise height, inches | 6.5 | 6.5 | 5 | 5 | 4 | 2 |
| Shrinkage | slight | ¼" | ¼" | ½" /2/ | ¾" /2/ | none /3/ |
| Foam Properties | | | | | | |
| Core density, pcf. | 1.59 | 1.76 | 2.07 | 1.98 | 2.35 | — |
| Compressive strength, psi (25° C.) | | | | | | |
| Parallel | 19.4 | 16.3 | 16.2 | 19.5 | 29.7 | — |
| Perpendicular | 9.2 | 9.6 | 10.1 | 13.6 | 15.8 | — |
| Friability, % weight loss | | | | | | |

TABLE VI-continued

|  | | | | | | |
|---|---|---|---|---|---|---|
| After 2 minutes | 10.0 | 11.4 | 12.6 | 13.8 | 14.9 | — |
| After 10 minutes | 51.3 | 57.9 | 61.7 | 64.9 | 65.5 | — |
| 10 minute weight loss, normalized to 2.00 pcf. | 40.8 | 51.0 | 63.9 | 64.3 | 77.0 | — |

/1/ As defined in Table I based on 300 parts by weight of resole.
/2/ Very hard foam.
/3/ Product was very, very hard; properties not measured.

The results of Table VI indicate that, although the combination of methyl formate and 1,1,2-trichloro-1,2,2-trifluoroethane functioned as a blowing agent for conventional Resole II employed in Examples 15 to 18, the employment of methyl formate as the sole source of blowing action in Run C-12, provided essentially no rise and an unsatisfactory product. The values given in Table VI for the 10 minute weight loss determinations, normalized to a foam density of 2.00 pcf., form the basis of line labeled I of the accompanying drawing. As previously noted, line labeled II is based on corresponding data of Table V the foams of which were derived from ion exchanged resoles. As shown by line labeled II, 1,1,2-trichloro-1,2,2-trifluoroethane/methyl formate combinations containing methyl formate in an amount up to 80 weight percent caused no more than about a 26 weight percent increase in foam friability as compared with the friability resistance of phenolic foam blown solely with the trichlorotrifluoroethane. At methyl formate concentrations up to about 70 weight percent, the friability resistance of the foams derived from the ion exchanged resoles was either about the same as the foam blown with 1,1,2-trichloro-1,2,2-trifluoroethane only or the friability resistance was improved. From the standpoint of realizing improvement in friability resistance of foams derived from ion exchanged resoles, the methyl formate content of the blowing agent is preferably maintained at a level of no more than about 65 weight percent and most preferably is between about 25 and about 60 weight percent. The lack of substantial increase in the friability of foams prepared from the ion exchanged resoles at methyl formate concentrations up to about 80 weight percent is unexpected in view of the effect on friability which increasing concentrations of methyl formate have on foams derived from conventional resoles. Thus, as shown by line labeled I of the drawing, as the methyl formate concentration is increased, the friability of the foam is also steadily increased. Therefore, in the use of the methyl formate/1,1,2-trichloro-1,2,2-trifluoroethane combinations of the present invention as blowing agents for phenolic foam derived from conventional resoles, it is recommended that no more than about 50 weight percent of the total weight of the blowing agent be constituted of methyl formate.

EXAMPLE 19

This example illustrates the effect of methyl formate as a viscosity reducing additive to phenol-formaldehyde resoles. For this purpose, the resole employed was above-described ion exchanged Resole E to which water had been added in an amount sufficient to raise the water content thereof to 1.8 weight percent. The viscosity of the resultant composition was 106,000 centipoise (26° C.). Methyl formate was added to 100 parts by weight of the resole, in three respective increments of one part by weight. The viscosity of the resole after each addition of methyl formate is given in the following Table VII.

TABLE VII

| Methyl Formate Added /1/ | Resole Viscosity (cps. at 26° C.) |
|---|---|
| 0 | 106,000 |
| 1 | 55,000 |
| 2 | 37,500 |
| 3 | 33,000 |

/1/ Total parts by weight added to 100 parts by weight of Resole E containing 1.8 weight percent water.

The results of Table VII demonstrate that methyl formate in as low a concentration as one weight percent, reduced the viscosity of the resole to about one-half the original value. In general, the resultant low viscosity remains essentially unchanged upon aging of the resole/methyl formate blends for about 3 to 4 weeks under ambient conditions. This effect of methyl formate as a viscosity lowering additive as well as its ability to function as a source of blowing action for phenolic foam, is applied with particular advantage to the foaming of resoles which are otherwise too viscous to be foamed by conventional blowing agents, as demonstrated by data which follows.

EXAMPLE 20

In this example, a study was made of the effect of methyl formate alone and in combination with 1,1,2-trichloro-1,2,2-trifluoroethane as a viscosity lowering additive to phenol-formaldehyde resoles. For this purpose, ion exchanged Resole H and conventional Resole II (described under Examples 15 to 18) were employed. As used in this study, the respective viscosities of Resoles H and II were 46,000 and 3400 centipoise at 25° C. In this study, samples (200 grams each) of the respective resoles were blended thoroughly with 20 grams of 1,1,2-trichloro-1,2,2-trifluoroethane only, 20 grams of methyl formate only and 20 grams of various combinations of 1,1,2-trichloro-1,2,2-trifluoroethane and methyl formate. After thorough mixing, the respective blends were allowed to stand in a sealed container for any air to escape prior to measuring the viscosity thereof. The results are given in the following Table VIII.

TABLE VIII

| Resole (200 gms) | Cl$_2$FC—CClF$_2$ (grams) | Methyl Formate (grams) | Viscosity (cps., 25° C.) |
|---|---|---|---|
| H | 0 | 0 | 46,000 |
| H | 20 | 0 | 47,500 |
| H | 16 | 4 | 19,500 |
| H | 10 | 10 | 11,700 |
| H | 4 | 16 | 4,150 |
| H | 0 | 20 | 2,680 |
| II | 0 | 0 | 3,400 |
| II | 20 | 0 | 3,500 |
| II | 16 | 4 | 2,440 |
| II | 10 | 10 | 1,200 |
| II | 4 | 16 | 870 |
| II | 0 | 20 | 650 |

The results of Table VIII show the marked effect of methyl formate as a viscosity lowering additive for phenolic resoles. This viscosity lowering effect is especially pronounced when methyl formate is combined with the ion exchanged resoles. Thus, as shown in Table VIII, ion exchanged Resole H had an initial viscosity of 46,000 centipoise and, when blended with 1,1,2-trichloro-1,2,2-trifluoroethane (10 parts by weight per 100 parts of resole), the viscosity of the blend was 47,500 centipoise. On the other hand, the presence of methyl formate in an amount of only 2 parts by weight per 100 parts of resole, provided a blend having the significantly lower viscosity of 19,500 centipoise. An explanation for this result is that, in contrast to functioning as a diluent at such low concentrations, methyl formate is functioning to cleave hydrogen bonding between molecular resole species such as may exist through interaction of $H_2O$/methylol, methylol/methylol, dimethylene ether/$H_2O$, dimethylene ether/methylol, and other such sites.

EXAMPLES 21 AND 22

In these examples, above-described highly viscous Resoles J and I were employed as the respective resole components of Foam Formulation A defined In Table I. The blowing agent consisted of 25 weight percent of 1,1,2-trichloro-1,2,2-trifluoroethane and 75 weight percent of methyl formate, and was used in a total amount of 20 parts by weight for the 300 parts by weight charge of resole. The results are given in Table IX hereinbelow. Also included in Table IX are data for foam preparations (Run Nos. C-13 and C-14) wherein Resoles J and I as freshly prepared (that is, above-described Resoles J-1 and I-1) were used as the respective resole components of Foam Formulation A and 1,1,2-trichloro-1,2,2-trifluoroethane was the sole source of blowing action. Table IX also includes Run Nos. C-15 and C-16 which were attempts to foam Resoles J and I as the resole component of Foam Formulation A wherein the sole blowing agent was also 1,1,2-trichloro-1,2,2-trifluoroethane. Table IX follows.

combination with methyl formate, advantage could be realized of the relatively good reactivity which has been retained by aged, ion exchanged Resole J which, as shown by the results of Example 21, provided a foam rise of 4.5 inches and a foam density of 3.73 pcf. Especially noteworthy is that the foam formulation of Example 21 contained only 5 parts by weight of methyl formate per 100 parts of Resole J which had a viscosity of 680,000 centipoise. In regard to Example 22, it is noted that, although heat aged Resole I had retained very little reactivity as a foamable composition, as reflected by the high foam density of 6.30 pcf. and rise of only one inch, it was nevertheless feasible to process this extremely viscous material by using the blowing agent of the present invention.

EXAMPLE 23

In accordance with this example, ion exchanged Resole G having an approximated viscosity of 500,000 centipoise at 25° C. was employed as the resole component of Foam Formulation A defined in Table I. As previously described, Resole G had been subjected to accelerated heat aging followed by ambient aging for 588 days. In this foam preparation, the blowing agent was used in a total amount of 54 parts by weight (or 18 parts by weight per 100 parts of resole) and was constituted of about 72 weight percent of 1,1,2-trichloro-1,2,2-trifluoroethane and about 28 weight percent of methyl formate. The aqueous solution of fluoboric acid catalyst was used in a total amount of 27 parts by weight. The reactivity data and foam properties are given in Table X which follows.

TABLE X

| Example No. | 23 |
|---|---|
| Foam No. | 35 |
| Foam Formulation A /1/ | |
| Resole | G /2/ |
| Catalyst, pts. by wt. | 27 |
| Blowing agent, pts. by wt. | |
| A. Trichlorotrifluoroethane | 39 |
| B. Methyl formate | 15 |
| Weight ratio A:B | 72/28 |
| Cream time, seconds | 25 |

TABLE IX

| Example No. | — | — | — | — | 21 | 22 |
|---|---|---|---|---|---|---|
| Run No. | C-13 | C-14 | C-15 | C-16 | — | — |
| Foam No. | 31 | 32 | — | — | 33 | 34 |
| Foam Formulation A /1/ | | | | | | |
| Resole | J-1 /2/ | I-1 /3/ | J /4/ | I /5/ | J | I |
| Catalyst, pts. by wt. | 9 | 9 | 9 | 9 | 9 | 9 |
| Blowing agent, pts. by wt. | | | | | | |
| A. Trichlorotrifluoroethane | 20 | 20 | 20 | 20 | 5 | 5 |
| B. Methyl formate | — | — | — | — | 15 | 15 |
| Weight ratio A:B | 100/0 | 100/0 | 100/0 | 100/0 | 25/75 | 25/75 |
| Cream time, seconds | 10 | 20 | — | — | 25 | 40 |
| Rise time, seconds | 50 | 70 | — | — | 90 | 115 |
| Tack-free time, seconds | 60 | 50 | — | — | 65 | 70 |
| Rise height, inches | 7.0 | 6.0 | — | — | 4.5 | 1.0 |
| Foam density, pcf. | 2.12 | 2.27 | /6/ | /6/ | 3.73 | 6.30 |

/1/ As defined in Table I based on 300 parts by weight charge of resole.
/2/ Resole J as freshly prepared; viscosity at 25° C. = 156,000 centipoise.
/3/ Resole I as freshly prepared; viscosity at 25° C. = 200,000 centipoise
/4/ Resole J-1 after heat aging at 65° C. for 12 hours; viscosity = 680,000 centipoise.
/5/ REsole I-1 after heat aging at 65° C. for 12 hours; viscosity = too viscous to measure.
/6/ No foam; too viscous to foam.

Inspection of the results set forth in Table IX shows that, whereas 1,1,2-trichloro-1,2,2-trifluoroethane was effective as the sole blowing agent in Run Nos. C-13 and C-14 wherein the respective viscosities of the resoles were 156,000 and 200,000 centipoise, it was not effective in the attempted foam preparations of Run Nos. C-15 and C-16 wherein the respective resoles were markedly more viscous. On the other hand, by the employment of 1,1,2-trichloro-1,2,2-trifluoroethane in

| Rise time, seconds | 125 |
|---|---|
| Tack free time, seconds | 75 |
| Rise height, inches | 8.5 |
| Shrinkage | None |
| Foam Properties | |
| Core density, pcf. | 1.73 |
| Compressive strength, psi (25° C.) | |
| Parallel | 16 |
| Perpendicular | 8 |
| Friability, % weight loss | |
| After 2 minutes | 8 |

TABLE X-continued

| | |
|---|---|
| After 10 minutes | 35 |

/1/ As defined in Table I based on 300 parts of Resole G.
/2/ Viscosity at 25° C. was approximately 500,000 cps.

The data of Table X demonstrates that, notwithstanding its age and high viscosity, ion exchanged Resole G had retained good reactivity as a foamable composition as reflected in particular by the relatively low density (1.73 pcf.) of the foam product, and that the 1,1,2-trichloro-1,2,2-trifluoroethane/methyl formate blowing agent of the invention allowed for proper mixing of the formulation ingredients with the highly viscous resole and provided good blowing action. On the other hand, the use of 1,1,2-trichloro-1,2,2-trifluoroethane as the sole source of blowing action for such highly viscous resoles either hampers proper mixing or is totally ineffective as the blowing agent.

EXAMPLE 24

In this example, phenolic foam was prepared employing a conventional phenol-formaldehyde resole designed for manufacture of medium density (2 to 2.5 pcf.) rigid phenolic foam. In the commercial manufacture of this grade of foamable resin, the condensation of phenol and formaldehyde is effected in the presence of barium hydroxide catalyst and the alkaline condensate is subsequently neutralized with dilute sulfuric acid. The resultant solubilized barium salt remains in the resole as a component thereof. Prior to use, this grade of resole is normally stored under refrigeration (5° C.) for retention of maximum reactivity as a foamable composition so as to meet the indicated foam density specification. The particular batch of this commercially produced resle employed in this example is referred to herein as Resole III. As manufactured, Resole III has the following properties: a viscosity of about 4650 centipoise at 25° C., a water content of 5.6 weight percent, a pH of 5.9 and a foam density specification of 2.3 pcf. Prior to use in the present example, Resole III had been aged at ambient temperatures in a closed glass container for a total of 330 days during which period its viscosity had increased to 657,000 centipoise at 25° C. In the foam preparation of this example, aged Resole III was used as the resole component of Foam Formulation A of Table I. The blowing agent was used in a total amount of 57 parts by weight (or 19 parts by weight per 100 parts of resole) and was constituted of about 68 weight percent of 1,1,2-trichloro-1,2,2-trifluoroethane and about 32 weight percent of methyl formate. The aqueous solution of fluoboric acid catalyst was used in a total amount of 27 parts by weight. The reactivity data and foam properties are given in Table XI which follows.

TABLE XI

| | |
|---|---|
| Example No. | 24 |
| Foam No. | 36 |
| Foam Formulation A /1/ | |
| Resole | III /2/ |
| Catalyst, pts. by wt. | 27 |
| Blowing agent, pts. by wt. | |
| A. Trichlorotrifluoroethane | 39 |
| B. Methyl formate | 18 |
| Weight ratio A:B | 68/32 |
| Cream time, seconds | 85 |
| Rise time, seconds | 300 |
| Tack free time, seconds | 120 |
| Rise height, inches | 4.5 |
| Shrinkage | some |
| Foam Properties | |
| Core density, pcf. | 3.53 |
| Compressive strength, psi (25° C.) | |
| Parallel | 20 |
| Perpendicular | 13 |
| Friability, % weight loss | |
| After 2 minutes | 16 |
| After 10 minutes | 54 |

/1/ As defined in Table I based on 300 parts of Resole III.
/2/ Viscosity at 25° C. was 657,000 centipoise.

The results of Table XI show that ambient aged Resole III was of low reactivity as a foamable composition as reflected in particular by the foam density of 3.73 pcf. which is high considering the fact that the formulation contained 27 parts by weight of the aqueous fluoboric acid catalyst solution. Notwithstanding the low reactivity of the aged resole, the blowing agent of the invention nevertheless allowed for processing of this extremely viscous material and utilization of the reactivity which did remain.

EXAMPLES 25 to 27

The purpose of these examples is to illustrate the effect of the methyl formate/1,1,2-trichloro-1,2,2-trifluoroethane blowing agent of the invention on cell size of phenolic foam. For this purpose, conventional Resole II and ion exchanged Resole H were employed as the respective resole components of Foam Formulation A defined in Table I. In these examples, the blowing agent contained 50 weight percent of each of the trichlorotrifluoroethane and methyl formate. The total amount of blowing agent and catalyst employed, as well as the results, are given in the following Table XII. Also included in Table XII are comparative data as Run Nos. C-17 to C-22 in which the blowing agent was either 1,1,2-trichloro-1,2,2-trifluoroethane or methyl formate individually.

TABLE XII

| Example No. | — | 25 | — | — | 26 | — | — | 27 | — |
|---|---|---|---|---|---|---|---|---|---|
| Run No. | C-17 | — | C-18 | C-19 | — | C-20 | C-21 | — | C-22 |
| Foam No. | 37 | 38 | 39 | 40 | 41 | 42 | 43 | 44 | 45 |
| Foam Formulation A /1/ | | | | | | | | | |
| Resole | II | II | II | II | II | II | H | H | H |
| Catalyst, pts. by wt. | 21 | 21 | 21 | 24 | 24 | 27 | 9 | 9 | 9 |
| Blowing agent, pts. by wt. | | | | | | | | | |
| A. Trichlorotrifluoroethane | 30 | 15 | 0 | 40 | 20 | 0 | 30 | 15 | 0 |
| B. Methyl formate | 0 | 15 | 30 | 0 | 20 | 40 | 0 | 15 | 30 |
| Weight ratio A:B | 100/0 | 50/50 | 0/100 | 100/0 | 50/50 | 0/100 | 100/0 | 50/50 | 0/100 |
| Cream time, seconds | 95 | 110 | 190 /2/ | 45 | 55 | 125 | 40 | 70 | 100 |
| Rise time, seconds | 240 | 260 | — | 120 | 180 | 170 | 95 | 165 | 140 |
| Tack-free time, seconds | 145 | 340 | — | 200 | 360 | 170 | 150 | 270 | 140 |
| Rise height, inches | 5 | 4 | — | 7 | 6¼ | 3 | 8 | 7 | 6 |
| Shrinkage | ⅛" | ¼" | — | none | ¼" | none | ¼" | ¼" | none |
| Foam Properties | | | | | | | | | |
| Core density, pcf. | 2.47 | 2.67 | — | 1.79 | 1.84 | S | 1.27 | 2.02 | 1.64 /3/ |
| Compressive strength, psi. (25° C.) | | | | | | | | | |
| Parallel | 31.7 | 34.9 | — | 16.4 | 11.3 | | 13.5 | 16.6 | 12.2 |
| Perpendicular | 21.4 | 21.0 | — | 24.6 | 21.7 | P | 8.6 | 8.7 | 6.8 |
| Friability, % weight loss | | | | | | | | | |

TABLE XII-continued

| | | | | | | | | | |
|---|---|---|---|---|---|---|---|---|---|
| Density, pcf. | 3.20 | 2.98 | — | 1.95 | 2.22 | | 1.39 | 1.58 | 1.27 |
| After 2 minutes | 5.0 | 7.4 | — | 10.2 | 12.7 | | 9.1 | 15.0 | 35.0 |
| After 10 minutes | 38.1 | 40.6 | — | 51.2 | 60.0 | L | 57.8 | 46.0 | 99.99 |
| 10 minute weight loss, normalized to 1.5 pcf. | — | — | — | 66.6 | 88.8 | | 53.6 | 48.5 | 84.7 |
| Cell Size: | | | | | | I | | | |
| Cell diameter /4/, cm. (average) | 0.026 | 0.018 | — | 0.021 | 0.022 | | 0.023 | 0.036 | 0.135 |
| Cell count, cells/cm. | 39.22 | 56.18 | — | 46.96 | 45.45 | | 44.4 | 27.78 | 7.40 |
| Cell count, cells/linear inch | 99.62 | 142.70 | — | 119.28 | 115.44 | T | 112.78 | 70.56 | 18.80 |

/1/ As defined in Table I based on 300 parts by weight charge of resole.
/2/ Mixture did not rise after 190 seconds.
/3/ Foam exhibited excessive split formation.
/4/ Perpendicular to direction of rise.

Inspection of Table XII shows that methyl formate in combination with 1,1,2-trichloro-1,2,2-trifluoroethane as the blowing agent for ion exchanged Resole H (Example 27) provided foam having a markedly larger cell size than foam blown with the trichlorotrifluoroethane only as in Run C-21. Thus, in Example 27, the cell diameter of Foam 44 was 0.036 centimeters and the average number of cells per linear inch was 70.56, whereas the corresponding measurements for Foam 43 (Run C-21) where 0.023 and 112.78, respectively. It is noted that although Foam 44 was of larger cell size than Foam 43, it is a finer celled rigid foam relative to conventional polyurethane foam. The formation of more coarsely porous phenolic foam such as Foam 44, is desirable for a number of end-use applications. Illustrative is the use of phenolic foam for lamination, as noted in U.S. Pat. No. 3,779,959. The effect of methyl formate on the cell size of foam derived from ion exchanged resoles is in contrast to its effect on cell size of foam derived from conventional resoles such as Resole II employed in Examples 25 and 26. In these latter examples, the presence of methyl formate had either no significant effect on cell size (compare the results of Example 26 with those of Run C-19) or provided a finer celled foam relative to the cell size of foam blown solely with the trifluorotrichloroethane (compare the cell size measurements of Foam 38 of Example 25 with those of Foam 37 of Run C-17).

EXAMPLE 28

In this example, ion exchanged Resole H was employed as the resole component of Foam Formulation B defined in Table I in which the catalyst was a 65 weight percent aqueous solution of phenolsulfonic acid. In this example, the blowing agent was used in a total amount of 30 parts by weight and contained 50 weight percent of each of 1,1,2-trichloro-1,2,2-trifluoroethane and methyl formate. For the purpose of comparison, foams were also prepared (Runs C-23 and C-24) employing ion exchanged Resole H as the resole component of Foam Formulation B except that the blowing agent was either 1,1,2-trichloro-1,2,2-trifluoroethane or methyl formate individually.

The results including foam physical properties and cell size are given in Table XIII which follows.

TABLE XIII

| Example No. | — | 28 | — |
|---|---|---|---|
| Run No. | C-23 | — | C-24 |
| Foam No. | 46 | 47 | 48 |
| Foam Formulation B /1/ | | | |
| Resole | H | H | H |
| Blowing agent, pts. by wt. | | | |
| A. Trichlorotrifluoroethane | 30 | 15 | 0 |
| B. Methyl formate | 0 | 15 | 30 |
| Weight ratio A:B | 100/0 | 50/50 | 0/100 |
| Cream time, seconds | 55 | 50 | 70 |
| Rise time, seconds | 80 | 105 | 105 |
| Tack free time, seconds | 100 | 120 | 195 |

TABLE XIII-continued

| | | | |
|---|---|---|---|
| Rise height, inches | 8.5 | 8.5 | 6.5 |
| Shrinkage | none | none | none |
| Foam Properties | | | |
| Core density, pcf. | 1.64 | 1.39 | /2/ |
| Compressive strength /3/ | | | |
| Parallel | 17.3 | 13.1 | — |
| Perpendicular | 11.8 | 9.6 | — |
| Friability, % weight loss | | | |
| Density, pcf. | 1.76 | 1.81 | — |
| After 2 minutes | 12.7 | 10.5 | — |
| After 10 minutes | 59.4 | 57.0 | — |
| 10 minute weight loss, normalized to 1.5 pcf. | 69.7 | 68.8 | — |
| Cell size: | | | |
| Cell diameter /4/, cm. (ave.) | 0.022 | 0.030 | — |
| Cell count, cells/cm. | 45.25 | 33.50 | — |
| Cell count, cells/linear inch | 114.94 | 85.09 | — |

/1/ As defined in Table I based on 300 parts by weight charge of resole.
/2/ Excessive splits and voids in foam precluded cell size and property measurements.
/3/ Pounds per square inch (25° C.)
/4/ Perpendicular to direction of rise.

The cell size data of Table XIII further demonstrate that the use of methyl formate in combination with 1,1,2-trichloro-1,2,2-trifluoroethane as the blowing agent for phenolic foam formulations based on ion exchanged resoles as in Example 28, provides foam of coarser cell structure than foam which is blown with the chlorofluorocarbon only as in Run C-23. Thus, in regard to Foam 46 of Run C-23, the average cell diameter was 0.022 centimeter and the number of cells per linear inch was 114.94. On the other hand, the average cell diameter of Foam 47 of Example 28 was larger (0.030 centimeter) and a fewer number of cells per linear inch (85.09) were present. The results of Run. No. C-24 of Table XIII, as well as those of Runs C-18, C-20 and C-22 of Table XII, further indicate that methyl formate alone does not function as a satisfactory blowing agent.

What is claimed is:

1. A blend containing: (A) a phenolic resole, (B) methyl formate and (C) 1,1,2-trichloro-1,2,2-trifluoroethane, wherein the total combined weight of (B) and (C) is from about 2 to about 40 parts by weight per 100 parts by weight of (A) and, of the total combined weight of (B) and (C) contained in the blend, from about 5 to about 80 weight percent is methyl formate, provided the blend contains at least 0.4 and no more than about 20 parts by weight of methyl formate per 100 parts by weight of component (A).

2. A blend as defined in claim 1 in which the resole is a phenol-formaldehyde resole.

3. A blend as defined in claim 1 in which the resole is free of ionic species that respond to removal by the free acid form of a cation exchange resin and the free base form of an anion exchange resin.

4. A blend as defined in claim 1 in which the total combined weight of (B) and (C) is no more than about 20 parts by weight per 100 parts by weight of component (A).

5. A blend as defined in claim 4 which contains no more than about 10 parts by weight of methyl formate per 100 parts by weight of component (A).

6. A method for producing phenolic foam which comprises polymerizing a phenolic resole in the presence of an acidic polymerization catalyst and, as a source of blowing action, methyl formate and 1,1,2-trichloro-1,2,2-trifluoroethane, wherein the combined weight of methyl formate and 1,1,2-trichloro-1,2,2-trifluoroethane is from about 2 to about 40 parts by weight per 100 parts by weight of resole and, of this combined weight, from about 5 to about 80 weight percent is methyl formate, provided methyl formate is present in an amount of at least 0.4 and no more than about 20 parts by weight per 100 parts by weight of the resole.

7. A method for producing phenolic foam which comprises polymerizing and foaming a reaction mixture containing a phenol-formaldehyde resole, an acidic polymerization catalyst and, as a source of blowing action, methyl formate and 1,1,2-trichloro-1,2,2-trifluoroethane, wherein the resole has a water content of no more than about 10 parts by weight per 100 parts of resole, and the combined weight of methyl formate and 1,1,2-trichloro-1,2,2-trifluoroethane contained in the reaction mixture is from about 2 to about 40 parts by weight per 100 parts by weight or resole and, of this combined weight, from about 5 to about 80 weight percent is methyl formate, provided the reaction mixture contains methyl formate in an amount of at least about 0.5 and no more than about 20 parts by weight per 100 parts by weight of resole.

8. A method as defined in claim 7 in which the reaction mixture contains, as an additional source of blowing action, trichloromonofluoromethane in an amount no more than about 5 parts by weight per 100 parts by weight of resole, provided no more than 30 weight percent of the combined weight of methyl formate, 1,2,2-trichloro-1,2,2-trifluoroethane and trichloromonofluoromethane is constituted of said latter component.

9. A method as defined in claim 7 in which the phenol-formaldehyde resole is free of ionic species that respond to removal by the free acid form of a cation exchange resin and the free base form of an anion exchange resin.

10. A method as defined in claim 7 in which the phenol-formaldehyde resole is the product of the method which comprises condensing phenol and formaldehyde in the presence of an alkaline metal catalyst, treating the alkaline condensate with the free acid form of a cationic exchange resin to a pH from 1.5 to about 4, and adding an alkaline compound to the cation exchanged liquid to raise the pH thereof to value between about 5 and about 6.7.

11. A method as defined in claim 7 in which no more than about 50 weight percent of the combined weight of methyl formate and 1,1,2-trichloro-1,2,2-trifluoroethane is constituted of methyl formate and in which the resoles is the product of the method which comprises condensing phenol and formaldehyde in the presence of an alkaline metal catalyst and neutralizing the alkaline condensate by the addition thereto of an acidic compound.

12. A method for producing phenolic foam which comprises polymerizing and foaming a reaction mixture containing a phenol-formaldehyde resole, an acidic polymerization catalyst, and, as a source of blowing action, methyl formate and 1,1,2-trichloro-1,2,2-trifluoroethane, wherein the resole has a water content of no more than about 10 parts by weight per 100 parts by weight of resole and is free of ionic species that respond to removal by the free acid form of a cation exchange resin and the free base form of an anion exchange resin, and wherein the combined weight of methyl formate and 1,1,2-trichloro-1,2,2-trifluoroethane contained in the reaction mixture is between about 2 and about 40 parts by weight per 100 parts by weight of resole and, of this combined weight, from about 5 to about 70 weight percent is methyl formate, provided the reaction mixture contains methyl formate in an amount of at least about 0.04 and no more than about 20 parts by weight per 100 parts by weight of resole.

13. A method as defined in claim 12 in which the combined weight of methyl formate and 1,1,2-trichloro-1,2,2-trifluoroethane contained in the reaction mixture is no more than about 20 parts by weight per 100 parts by weight of resole.

14. A method as defined in claim 12 in which at least about 20 weight percent of the combined weight of methyl formate and 1,1,2-trichloro-1,2,2-trifluoroethane is methyl formate.

* * * * *